US006316490B1

(12) United States Patent
Vernier et al.

(10) Patent No.: US 6,316,490 B1
(45) Date of Patent: *Nov. 13, 2001

(54) SUBSTITUTED ARYL COMPOUNDS USEFUL AS MODULATORS OF ACETYLCHOLINE RECEPTORS

(75) Inventors: Jean-Michel Vernier; Ian A. McDonald, both of San Diego, CA (US)

(73) Assignee: Merck & Co., Inc., Rahway, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,954
(22) PCT Filed: Nov. 14, 1996
(86) PCT No.: PCT/US96/18569
  § 371 Date: Jul. 8, 1997
  § 102(e) Date: Jul. 8, 1997
(87) PCT Pub. No.: WO97/19059
  PCT Pub. Date: May 29, 1997

Related U.S. Application Data

(63) Continuation of application No. 08/559,811, filed on Nov. 17, 1995, now abandoned.
(60) Provisional application No. 60/035,344, filed on Nov. 17, 1995.

(51) Int. Cl.$^7$ .......................... C07D 207/08; A61K 31/40
(52) U.S. Cl. .......................... 514/428; 548/570; 548/566; 548/567
(58) Field of Search .......................... 514/428; 548/570, 548/566, 567

(56) References Cited

U.S. PATENT DOCUMENTS

| | | | |
|---|---|---|---|
| 3,247,213 | 4/1966 | Büchel et al. | 260/291 |
| 4,048,333 | 9/1977 | Galabov et al. | 424/322 |
| 4,155,909 | 5/1979 | Sanders et al. | 546/193 |
| 4,321,387 | 3/1982 | Chavdarian et al. | 546/281 |
| 4,965,074 | 10/1990 | Leeson | 424/449 |
| 5,130,309 | 7/1992 | Shanklin, Jr. et al. | 514/210 |
| 5,175,301 | 12/1992 | Minamida et al. | 546/272 |
| 5,212,188 | 5/1993 | Caldwell et al. | 514/343 |

(List continued on next page.)

FOREIGN PATENT DOCUMENTS

| | | |
|---|---|---|
| 2106895 | 3/1994 | (CA) . |
| 1231704 | 1/1967 | (DE) . |
| 0 302 389 A2 | 2/1989 | (EP) . |
| 0 412 798 A2 | 2/1991 | (EP) . |
| 0 427 636 A2 | 5/1991 | (EP) . |
| 0 537 993 A1 | 4/1993 | (EP) . |
| 0 559 495 A1 | 9/1993 | (EP) . |
| 0 567 251 A1 | 10/1993 | (EP) . |

(List continued on next page.)

OTHER PUBLICATIONS

Kaszubska et al., Chem. Abstract 101:54832, 1984.*
Bal et al., Chem. Abstract 99:5466, 1983.*
Aislaitner et al., "The Synthesis of 1' –N–Methyl–2' Oxoanabasine, an Analogue of Continine", *Bioorganic Med. Chem. Lett.* 4 (3):515–520 (1994).
Albanese et al., "Chronic Administration of 1–Methyl–4–Phenyl–1, 2, 3, 6 –Tetrahdrophyridine to Monkeys: Behavioural, Morphological and Biochemical Correlates", *Neuroscience* 55 (3):823–932 (1993).
Aubert et al., "Comparative Alterations of Nicotinic and Muscarinic Binding Sites in Alzheimer's and Parkinson's Diseases", *J. Neurochem.* 58 (2):529–541 (1992).
Borch et al., "The Cyanohydridoborate Anion as a Selective Reducing Agent", *J. Am. Chem. Soc.* 93 (12):2897–2904 (1971).
Brioni et al., "Nicotinic Receptor Agonists Exhibit Anxiolytic–Like Effects on the Elevated Plus–Maze Test", *Eur. J. Pharmacol.* 238:1–8 (1993).

(List continued on next page.)

Primary Examiner—Mukund J. Shah
Assistant Examiner—Deepak R. Rao
(74) Attorney, Agent, or Firm—Shu M. Lee; David L. Rose

(57) ABSTRACT

In accordance with the present invention, a novel class of substituted aryl compounds (containing ether, ester, amide, ketone or thioether substitution) that promote the release of ligands involved in neurotransmission have been discovered. In a particular aspect, compounds of the present invention are capable of modulating acetylcholine receptors. The compounds of the present invention are capable of displacing one or more acetylcholine receptor ligands, e.g., $^3$H-nicotine, from mammalian neuronal membrane binding sites. Invention compounds may act as agonists, partial agonists, antagonists or allosteric modulators of acetylcholine receptors. Therapeutic indications for compounds with activity as acetylcholine receptors include diseases of the central nervous system such as Alzheimer's disease and other diseases involving memory loss and/or dementia (including AIDS dementia); cognitive dysfunction (including disorders of attention, focus and concentration), disorders of extrapyramidal motor function such as Parkinson's disease, progressive supramuscular palsy, Huntington's disease, Gilles de la Tourette syndrome and tardive dyskinesia; mood and emotional disorders such as depression, anxiety and psychosis; substance abuse including withdrawal symptoms and substitution therapy; neurocrine disorders and dysregulation of food intake, including bulimia and anorexia; disorders of nociception and control of pain; autonomic disorders including dysfimction of gastrointestinal motility and function such as inflammatory bowel disease, irritable bowel syndrome, diarrhea, constipation, gastric acid secretion and ulcers; pheochromocytoma, cardiovascular dysfunction including hypertension and cardiac arrhythmias, as well as co-medication uses in surgical applications.

19 Claims, 3 Drawing Sheets

U.S. PATENT DOCUMENTS

| | | | |
|---|---|---|---|
| 5,214,060 | 5/1993 | Caldwell et al. | 514/343 |
| 5,214,152 | 5/1993 | Minamida et al. | 548/181 |
| 5,248,690 | 9/1993 | Caldwell et al. | 514/408 |
| 5,278,176 | 1/1994 | Lin | 514/343 |
| 5,399,575 | 3/1995 | Friebe et al. | 514/340 |
| 5,418,229 | 5/1995 | Alker et al. | 514/220 |
| 5,538,956 | 7/1996 | Minchin et al. | 514/114 |
| 5,547,991 | 8/1996 | Palfreyman et al. | 514/564 |
| 5,571,832 | 11/1996 | de Costa et al. | 514/408 |

FOREIGN PATENT DOCUMENTS

| | | |
|---|---|---|
| 0 567 703 A1 | 11/1993 | (EP) . |
| 0 568 208 A1 | 11/1993 | (EP) . |
| 0 571 139 A1 | 11/1993 | (EP) . |
| 0 600 373 A1 | 11/1993 | (EP) . |
| 0 575 048 A1 | 12/1993 | (EP) . |
| 2714376 | 1/1994 | (FR) . |
| WO 94/08992 | 4/1904 | (WO) . |
| WO 92/15306 | 9/1992 | (WO) . |
| WO 92/21339 | 12/1992 | (WO) . |
| WO 93/22302 | 11/1993 | (WO) . |
| WO 94/01435 | 1/1994 | (WO) . |
| WO 94/05288 | 3/1994 | (WO) . |
| WO 94/13291 | 6/1994 | (WO) . |
| WO 94/18959 | 9/1994 | (WO) . |
| WO 95/21615 | 8/1995 | (WO) . |
| WO 96/32100 | 10/1996 | (WO) . |
| WO 96/40095 | 12/1996 | (WO) . |
| WO 96/40140 | 12/1996 | (WO) . |
| WO 96/40633 | 12/1996 | (WO) . |

OTHER PUBLICATIONS

Burk et al., "Preparation and Use of $C_2$–Symmetric Bis (phospholanes): Production of α–Amino Acid Derivatives via Highly Enantioselective Hyrdrogenation Reactions", *J. Am. Chem. Soc.* 115:10125–10138 (1993).

Burk et al., "Catalytic Asymmetric Reductive Amination of Ketones via Highly Enantioselective Hydrogenation of the C=N Double Bond", *Tetrahedron* 50 (15): 4399–4428 (1994).

Chavdarian et al., "Synthesis of Optically Active Nicotinoids" *J. Org. Chem.* 47:1069–1073 (1982).

Cho and Chun, "Asymmetric Reduction of N–Substituted Ketimines with the Reagent prepared from Borane and (S)–(=)–2–Amino–3–methyl–1, 1–diphenylbutan–1–o1 (Itsuno's Reagent): Enantioselective Synthesis of Optically Active Secondary Amines", *J. Chem. Soc. Perk.* 1:3200–3201 (1990).

Christensen et al., "On the Supersensitivity of Dopamine Receptors, Induced by Neuroleptics", *Psychoparmacol.* 48:1–6 (1976).

Clow et al., "Changes in Dopamine–Medicated Behavior During One Year's Neuroleptic Administration", *Euro. J. Pharmacol.* 57: 365–375 (1979).

Colpaert, F.C., "Pharmacological Characteristics of Tremor, Rigidity and Hypokinesia Induced by Reserpine in Rat", *Neuro.* 26 (9):1431–1440 (1987).

Coyle et al., "Kainic Acid: Insights From a Neurotoxin into the Pathophysiology of Huntington's Disease", *Neurobehav. Toxicol. Tetatol.* 5:617–624 (1983).

Cushman and Castognoli, Jr., "The Synthesis of trans–3'–Methylnicotine", *J. Org. Chem.* 37 (8): 1268–1271 (1972).

D'Amour and Smith, "A Method for Determining Loss of Pain Sensation" *Pharmacol. Exp. Ther.* 72:74–79 (1941).

Dwoskin et al., "Inhibition of [$^3$H] Dopamine Uptake into Rat Striatal Slices by Quaternary N–Methylated Nicotine Metabolites", *Life Sciences* 50 (25): PL–233—Pl–237 (1992).

Emerich et al., "Nicotine Potentiates Haloperidol–Induced Catalepsy and Locomotor Hypoactivity", *Pharmacol., Biochem. Behav.* 38:875–880 (1991).

Estrella et al., "A further study of the neuromuscular effects of vesamicol (AH5183) and of its enantiomer specificity" *Br. J. Pharmacol.* 93:759–768 (1988).

Garcia and Greco, "Facile Bromination of Pyridine–Type Heterocycles at the β–Position", *J. Am. Chem. Soc.* 82:4430–4431 (1960).

Glassco et al., "Synthesis, Optical Resolution, Absolute configuration, and Preliminary Pharmacology of (+)—and (–)–cis–2, 3, 3a, 4, 5 9b–Hexahydro–1–methyl–1H–pyrrolo–[3,2–h] isoquinoline, a Structural Analog of Nicotine" *J. Med. Chem.* 36:3381–3385 (1993).

Haglid, F., "The Methylation of Nicotine with methyl–lithium" *Acta Chem. Scand.* 21:329–334 (1967).

Hwang et al., "A synthesis of α–Substituted Amines" *J. Org. Chem.* 50:3885–3890 (1985).

Iwamoto, Edgar T., "Antinociception after Nicotine Administration into the Mesopontine Tegmentum of Rats: Evidence for Muscarinic Actions[1]", *J. Pharmacol. Exp. Ther.*, 251: 412–421 (1989).

Jacob III, Peyton, "Resolution of (±) –5–Bromonornicotine Synthesis of (R)– and (S) –Nornicotine of High Enantiomeric Purity" *J. Org. Chem.* 47:4165–4167 (1982).

Janson et al., "Differential effects of acute and chronic nicotine treatment on MPTP– (1–methyl–4–phenyl–1, 2, 3, 6–tetrahydropyridine) induced degeneration of nigrostriatal dopamine neurons in the black mouse" *Clin. Investig.* 70:323–238 (1992).

Kawate et al., "Asymmetric Reduction of Imines with Chiral Dialkoxyboranes" *Tetrahedron Asym.* 3 (2):227–230 (1992).

Kitamura et al., "General Asymmetric Synthesis of Isoquinoline Alkaloids. Enantioselective hydrogenation of Enamides Catalyzed by BINAP–Ruthenium (II) Complexes" *J. Org. Chem.* 59:297–310 (1994).

Klockgether and Turski, "NMDA Antagonists Potentiate Antiparkinsonian Actions of $_L$–Dopa in Monoamine–depleted Rats" *Ann. Neurol.* 28 (4):539–546 (1990).

Lange et al., "Altered Muscarinic and Nicotinic Receptor Densities in Cortical and Subcortical Brain Regions in Parkinson's Disease" *J. Neurochem.* 60 (1):197–2–3 )1993).

Leete et al., "Formation of 5–Fluoronicotine from 5–Fluoronicotinic Acid in Nicotiana Tabacum" *Phytochem.* 10:2687–2692 (1971).

Lin et al., "Synthesis and Evaluation of Nicotine Analogs as Neuronal Nicotinic Acetylcholine Receptor Ligands" *J. Med. Chem.* 37:3542–3553 (1994).

Manescalchi et al., "Reductive Amination of 1, 4– and 1,5–Dicarbonyl Compounds with (S) –Valine Methyl Ester. Synthesis of (S)–2–Pheylpiperidine." *Tetrahedron Letters* 35 (17): 2775–2778 (1994).

Mathre et al., "A Practical Process for the Preparation of Tetrahydro–1–methyl–3, 3–diphenyl–1H, 3H–pyrrolo[1, 2–c]–[1,3,2]oxazaborole—Borane. A Highly Enantioselective Stoichiometric and Catalytic Reducing Agent" *J. Org. Chem.* 58:2880–2888 (1993).

McDonald et al., "Enzyme–Activated Irreversible Inhibitors of Monoamine Oxidase: Phenylallylamine Structure–Activity Relationships" *J. Med. Chem.* 28:186–193 (1985).

McDonald and Bey, "A General Preparation of Fluoroallylamine Enzyme Inhibitors Incorporating a β–Substituted Heteroatom" *Tetrahedron Lett.* 26 (32):3807–3810 (1985).

Miyata et al., "Role of the Serotonin$_3$ Receptor in Stress–Induced Defecation" *J. Pharmacol. Exp. Ther.* 261 (1):297–303 (1992).

Nilsson and Hallberg, "Regioselective Palladium–Catalyzed Tandem α–Arylation/Isomerization of Cyclic Enamides" *J. Org. Chem.* 55:2464–2470 (1990).

Ozawa et al., "Palladium–Catalyzed Asymmetric Alkenylation of Cyclic Olefins", *Tetrahedron Letters* 34:2505–2508 (1993).

Pellow et al., "Validation of Open/Closed Arm Entries in an Elevated Plus–Maze as a Measure of Anxiety in the Rat" *J. Neuroscience Meth.* 14:149–167 (1985).

Ranganathan et al., "Nitroethylene: A Stable, Clean, and Reactive Agent for Organic Synthesis" *J. Org. Chem.* 45:1185–1189 (1980).

Rondahl, Lars, "Synthetic Analogues of Nicotine VI Nicotine Substituted in the 5–Position" *Acta Pharma. Suecica* 14 (2):113–118 (1977).

Rueppel and Rapoport, "Aberrant Alkaloid Biosysthesis. Formation of Nicotine Analogs from Unnatural Precursors in *Nicotiana glutinosa*", *J. Am. chem. Soc.* 93 (25):7021–7028 (1971).

Rupniak et al., "Cholinergic Manipulation of Perioral Behavior Induced by Chronic Neuroleptic Adminstration to Rats", *Psychopharmacol.* 79:226–230 (1983).

Sacaan et al., "Pharmacological Characterization of Neuronal Acetylcholine Gated Ion Channel Receptor–Medicated Hippocampal Norepinephrine and Striatal Dopamine Release from Rat Brain Slices", *J. Pharmacol, Exper. Therap.* 274 (1):224–230 (1995).

Schwarcz et al., "Quinolinic Acid: An Endogenous Metabolite that Produces Axon–Sparing Lesions in Rat Brain", *Science* 219:316–318 (1983).

Sershen et al., "Behavioral and Biochemical Effects of Nicotine in an MPTP–Induced Mouse Model of Parkinson's Disease", *Pharmacol. Biochem. Behav.* 28:299–303 (1987).

Shibagaki et al., "The Syntheses of 4–Aminonicotine and 4 Aminocotinine", *Heterocycles* 23 (7):1681–1684 (1985).

Sundstrom et al., "Chronic Neurochemical and Behavioral Changes in MPTP–Lesioned C57BL/6 Mice: A Model for Parkinson's Disease", *Brain Res.* 528:181–188 (1990).

Ungerstedt and Arbuthnott, "Quantitative Recording of Rotational Behavior in Rats After 6–Hydroxy–Dopamine Lesions of the Nigrostriatal Dophamine System", *Brain Res.* 24:485–493 (1970).

Ungerstedt et al., "Animal Models of Parkinsonism" *Advances in Neurol.* 3:257–271 (1973).

Von Voigtlander and Moore, "Turning Behavior of Mice with Unilateral 6–Hydroxydophamine Lesions in the Striatum: Effects of Apomorphine, $_L$–Dopa, Amantadine, Amphetamine and Other Psychomotor Stimulants", *Neuropharmacology* 12:451–462 (1973).

Waddington et al., "Spontaneous Orofacial Dyskinesia and Dopaminergic Function in Rats After 6 Months of Neuroleptic Treatment", *Science* 220:530–532 (1983).

Whitehouse et al., "Reductions in [$^3$H]nicotinic acetylcholine binding in Alzheimer's Disease and Parkinson's Disease: An Autoradiographic Study", *Neurology* 38:720–723 (1988).

Williams et al., "Stress–Induced Changes in Intestinal Transit in the Rat: A Model for Irritable Bowel Syndrome", *Gastroenterology* 94:611–621 (1988).

Williams et al., "Neuronal Nicotinic Acetylcholine Receptors", *Drug News & Perspectives* 7 (4):205–223 (1994).

Willoughby and Buchwald, Asymmetric Titanocene–Catalyzed Hydrogenation of Imines:, *J. Am. Chem. Soc.* 114:7562–7564 (1992).

Willoughby and Buchwald, "Synthesis of Highly Enantiomerically Enriched Cyclic Amines by the Catalytic Asymmetric Hydrogenation of Cyclic Imines", *J. Org. Chem.* 58 (27):7627–7629 (1993).

Wonnacott, S., "Neuronal Nicotinic Receptors: Functional Correlates of Ligand Binding Sites", *Biochem. Soc. Trans.* 19:121–124 (1991).

Yamada et al., "Asymmetric Reduction of Cyclic Imines with Chiral Sodium Acyloxyborohydrides", *J. Chem. Soc., Perk.* 1:265–279 (1983).

Yamada et al., "Effects of a Thienylalkylamine Derivative, T–1815, on Colonic Propulsion in Mice and Rats", *Jpn. J. Pharmacol.* 58 (Suppl.):131 (1992).

Zoltewicz et al., "Hydrolysis of Cholinergic Anabaseine and N–Methylanabaseine: Influence of Cosolvents on the Position of the Ring–Chain Equilibrium—Compensatory Changes", *Bioorganic Chem.* 18:395–412 (1990).

Alkondon and Albuquerque, "Diversity of Nicotinic Acetylcholine Receptors in Rat Hippocampal Neurons. III. Agonist Actions of the Novel Alkaloid Epibatidine and Analysis of Type II Current", *J. Pharmacol, Exper. Therap.* 274:771–782 (1995).

Anderson et al., "Characterization of [$^3$H]ABT–418: A Novel Cholinergic Channel Ligand" *J. Pharmacol. Exper. Therap.* 273:1434–1441 (1995).

Brown et al., "Chiral Synthesis of 3–Substituted Morpholines via Serine Enantiomers and Reductions of 5–Oxomorpholine–3–carboxylates" *J. Chem. Soc. Perkin Trans.* 1:2577–2580 (1985).

Chaki et al., "Design and Syntheses of 4–Acylaminopyridine Derivatives: Novel High Affinity Choline Uptake Enhancers I[1]", *Bioorgan. & Med. Chem. Let.* 5:1489–1494 (1995).

De Fiebre et al., "Characterization of a Series of Anabaseine–Derived Compounds Reveals that the 3–(4)–Dimethylaminocinnamylidine Derivative is a Selective Agonist at Neuronal Nicotinic α7/$^{125}$I–α–Bungarotoxin Receptor Subtypes", *Mol. Pharmacol.* 47:164–171 (1995).

Eremeev et al., "Synthesis, Structure, and Transformations of 1–AZA–3–OXA–7–Thiabicyclo[3.4.0]Nonan–2–One", *Chem. Heterocycl. Compd.* (English Translation) 22:1039–1044 (1986).

Flynn and Mash, "Characterization of L–[$^3$H] Nicotine Binding in Human Cerebral Cortex: Comparison Between Alzheimer's Disease and the Normal" *J. Neurochem.* 47:1948–1054 (1986).

Gaul and Fremuth, "Sulfer Heterocycles. II. 3–Aryl– and 3–Alkyl–2–thiazolidinone 1, 1–Dioxides: New Class of Cyclic Sulfone", *J. Org. Chem.* 26:5103–5105 (1961).

Gautier et al., "Isolement des bases organizues à l' état de thiocyanates", *Annales Pharmaceutiques Francaise Am. Pharm,. Fr.* 30:715 (1972).

Habermehl and Ecsv, "Synthesis of 4–AZA–2–OXA–6–Thiabicyclo[3.3.0]Octane", *Heterocycles* 7:1027–1032 (1977).

Hansson et al., "On the Quantitative Structure—Activity Relationships of Meta–Substituted (S)—Phenylpiperidines, a Class of Preferential Dopamine $D_2$ Autoreceptor Ligands: Modeling of Dopamine Synthesis and Release in Vivo by Means of Partial Least Squares Regression", *J. Med. Chem.* 38:3121–3131 (1995).

Kashiwabara et al., "Comparative Vasodepressor Effects of 3–Pyridine Derivatives Possessisng the Cyanoamidine or Amide Structure in Pithed Rats", *Arch. Int. Pharmacodyn* 328: 297–306 (1994).

Natsugari et al., "Novel, Potent, and Orally Active Substance P Antagonists: Synthesis and Antagonist Activity of N–Benzylcarboxamide Derivatives of Pyrido[3,4–b]pyridine" 38:3106–3120 (1995).

O'Neill et al., "Evidence for an involvement of D1 and D2 dopamine receptors in mediating nicotine–induced hyperactivity in rats", *Psychopharmacol.* 104:343–350 (1991).

Sacaan et al., "Pharmacological Characterization of Neuronal Acetylcholine Gated Ion Channel Receptor–Mediated Hippocampal Norepinephrine and Striatal Dopamine Release from Rat Brain slices", *J. Pharmacol. Exper. Therap.* 274:224–230 (1995).

Wróbel and Hejchman, "Spiro Derivatives of Tetrahydrothiophene. Synthesis of the Quinolizidine <3–spiro–2>tetrahydrothiophene System Using Solid/Liquid or Liquid/Liquid Phase– Transfer Catalysis", *Synthesis* 5:452–455 (1987).

Brain et al., "Pharmacodynamic Compounds. Part II. Some Rearrangements in the Pyrrolidine–Piperidine Series", *J. Chem. Soc.* 633:633–639 (1961).

Cannon and Milne, "NMR Spectroscopy in Distinguishing Between 3–Piperidyl– and 2–Pyrrolidylmethyl Alcohols, Amines, Esters, and Amides", *J. Heterocyclic Chem.* 13:685–689 (1976).

Elliott et al., "Phenyl Pyrrolidine Analogues as Potent Nicotinic Acetylcholine Receptor (naChR) Ligands", *Bioorganic & Medicinal Chemistry Letters* 5 (9):991–996 (1995).

Elliott et al., "2–(Aryloxymethyl) Azacyclic Analogues as Novel Nicotinic Acetylcholine Receptor (nAChR) Ligands", *Abstract #143. 210th American Chemical Society Meeting*, Chicago, IL (Aug. 20–24, 1995).

Kaszubska et al., "Synthesis of Derivatives of 2–(2–Arylthioethyl) Pyrrolidine", *Polish Journal of Chemistry* 56:1543–1547 (1982).

Kray and Reinecke, "A Convenient Preparation of Pyrrolizidine by Reductive Cyclization" *J. Org. Chem.* 32:225–227 (1967).

Levin et al., "An Alternative procedure for the Aluminum–mediated Conversion of Esters to Amides" *Synt. Com* 12(*13*): 989–993 (1982).

M. Madesclaire, "Synthesis of Sulfoxides by Oxidation of Thioethers" *Tetrahedron* 42:5459–5495 (1986).

Morie et al., "Ring Expansion of Nitrogen–containing chloromethylheteroalicycles via Aziridinium Intermediates" *J. Chem. Soc. Perkin Trans* . 1:2565–2569 (1994).

Nahm and Weinreb, "N–Methoxy–N–Methylamides as Effective Acylating Agents" *Tetrahedron Lett.* 22:3815–3818 (1981).

\* cited by examiner

SUBSTITUTED ARYL COMPOUNDS USEFUL AS MODULATORS OF ACETYLCHOLINE RECEPTORS

This application is a 371 of PCT/US96/18569 filed Nov. 14, 1996 which claims benefit from Ser. No. 60/035,344 filed Nov. 17, 1995 also Ser. No. 08/559, 811 Nov. 17, 1995 now abandoned.

The present invention relates to compounds which potentiate neurotransmission by promoting the release of neurotransmitters such as acetylcholine, dopamine and norepinephrine. More particularly, the present invention relates to compounds that are capable of modulating acetylcholine receptors. Invention compounds are useful, for example, for treatment of dysfunction of the central and autonomic nervous systems (e.g. dementia, cognitive disorders, neurodegenerative disorders, extrapyramidal disorders, convulsive disorders, cardiovascular disorders, endocrine disorders, eating disorders, affective disorders, drug abuse, and the like). In addition, the present invention relates to pharmaceutical compositions containing these compounds, as well as various uses therefor.

BACKGROUND OF THE INVENTION

By modulating neurotransmitter release (including dopamine, norepinephrine, acetylcholine and serotonin) from different brain regions, acetylcholine receptors are involved in the modulation of neuroendocrine function, respiration, mood, motor control and function, focus and attention, concentration, memory and cognition, and the mechanisms of substance abuse. Ligands for acetylcholine receptors have been demonstrated to have effects on attention, cognition, appetite, substance abuse, memory, extrapyramidal function, cardiovascular function, pain and gastrointestinal motility and function. The distribution of acetylcholine receptors that bind nicotine, i.e., nicotinic acetylcholine receptors, is widespread in the brain, including the basal ganglia, limbic system, cerebral cortex and mid- and hind-brain nuclei. In the periphery, the distribution includes muscle, autonomic ganglia, the gastrointestinal tract and the cardiovascular system.

Acetylcholine receptors have been shown to be decreased, inter alia, in the brains of patients suffering from Alzheimer's disease or Parkinson's disease, diseases associated with dementia, motor dysfunction and cognitive impairment. Such correlations between acetylcholine receptors and nervous system disorders suggest that compounds that modulate acetylcholine receptors will have beneficial therapeutic effects for many human nervous system disorders. Thus, there is a continuing need for compounds which have the ability to modulate the activity of acetylcholine receptors. In response to such need, the present invention provides a new family of compounds which modulate acetylcholine receptors.

BRIEF DESCRIPTION OF THE INVENTION

In accordance with the present invention, we have discovered a novel class of substituted aryl compounds (containing an ether, ester, amide, ketone or thioether functionality) that promote the release of ligands involved in neurotransmission. More particularly, compounds of the present invention are capable of modulating acetylcholine receptors.

The compounds of the present invention are capable of displacing one or more acetylcholine receptor ligands, e.g., $^3$H-nicotine, from mammalian neuronal membrane binding sites. In addition, invention compounds display activity in cell lines which express recombinant acetylcholine receptors. It can readily be seen, therefore, that invention compounds may act as agonists, partial agonists, antagonists or allosteric modulators of acetylcholine receptors. Therapeutic indications for compounds with activity at acetylcholine receptors include diseases of the central nervous system such as Alzheimer's disease and other diseases involving memory loss and/or dementia (including AIDS dementia); cognitive dysfunction (including disorders of attention, focus and concentration), disorders of extrapyramidal motor function such as Parkinson's disease, progressive supramuscular palsy, Huntington's disease, Gilles de la Tourette syndrome and tardive dyskinesia; mood and emotional disorders such as depression, anxiety and psychosis; substance abuse including withdrawal symptoms and substitution therapy; neurocrine disorders and dysregulation of food intake, including bulimia and anorexia; disorders or nociception and control of pain; autonomic disorders including dysfunction of gastrointestinal motility and function such as inflammatory bowel disease, irritable bowel syndrome, diarrhea, constipation, gastric acid secretion and ulcers; pheochromocytoma, cardiovascular dysfunction including hypertension and cardiac arrhythmias, as well as co-medication uses in surgical applications.

DETAILED DESCRIPTION OF THE INVENTION

Figure 1:
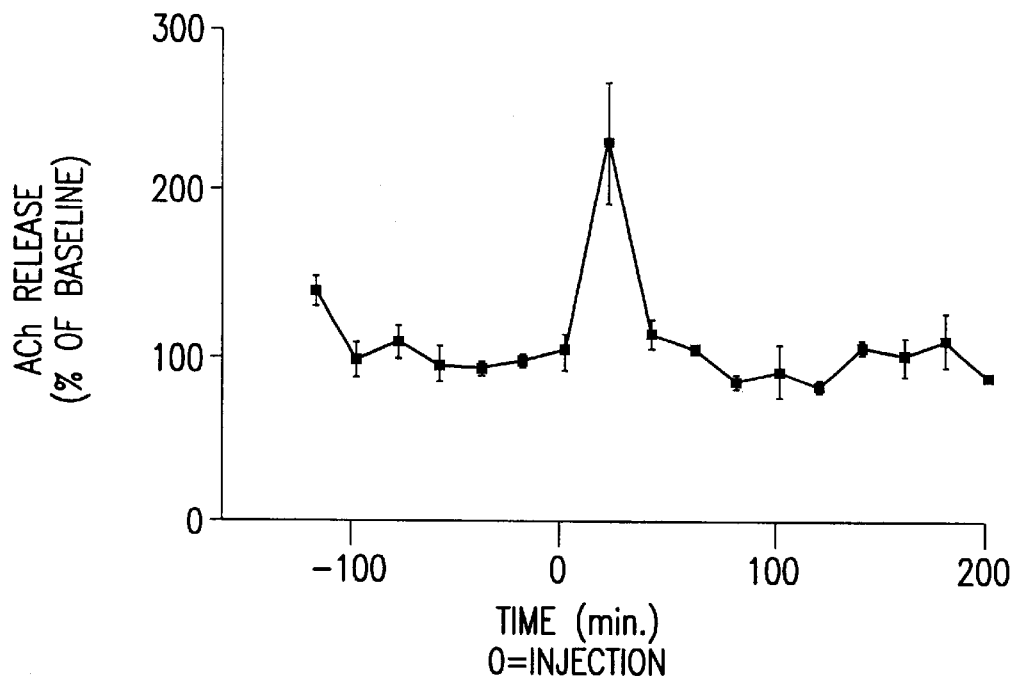
FIG. 1 illustrates the effect of saline injection on ACh release in the hippocampus. Saline (1.0 ml/kg) was injected subcutaneously at time=0 and acetylcholine levels measured as described in Example 7 (n=4 animals).

In accordance with the present invention, there are provided compounds having Formula Z, as follows:

A—B—D—E—G                                (Z)

or enantiomers, diastereomeric isomers or mixtures of any two or more thereof, or pharmaceutically acceptable salts thereof, wherein:

A is

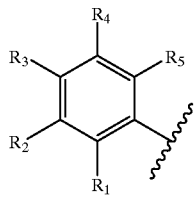

wherein:
each of $R_1$, $R_2$, $R_3$, $R_4$ and $R_5$ are independently selected from hydrogen, halogen, cyano, cyanomethyl, nitro, alkyl, substituted alkyl, cycloalkyl, substituted cycloalkyl, alkenyl, substituted alkenyl, alkynyl, substituted alkynyl, aryl, substituted aryl, alkylaryl, substituted alkylaryl, arylalkyl, substituted arylalkyl, heterocyclic, substituted heterocyclic, trifluoromethyl, pentafluoroethyl, —$OR_A$, —O—C(O) —$R_A$, —O—C(O)—N($R_A$)$_2$, —$SR_A$, —NHC(O)$R_A$ or —NHSO$_2R_A$, wherein $R_A$ is selected from H, lower alkyl, substituted lower alkyl, aryl or substituted aryl, or —N$R_BR_B$, wherein each $R_B$ is independently selected from hydrogen or lower alkyl;

B is optionally present; with the proviso that when B is absent and D is —O—, at least one of $R_1$, $R_2$, $R_3$, $R_4$ or $R_5$ is not hydrogen, and when B is present, B is selected from lower alkylene, substituted lower alkylene, cycloalkylene, substituted cycloalkylene, lower alkenylene, substituted lower alkenylene, or lower alkynylene;

D is optionally present; and when present is selected from —O—, —C(O)—, —C(O)—NR$_C$—, —C(O)—O—, —O—C(O)—NR$_C$—, —S—, —S(O)—, —S(O)—NR$_c$—, —S(O)$_2$—, —S(O)$_2$—NR$_c$— or

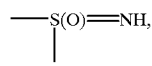

wherein $R_C$ is selected from hydrogen, lower alkyl or substituted lower alkyl;

E is selected from lower alkylene, substituted lower alkylene, lower alkenylene, substituted lower alkenylene or lower alkynylene, with the proviso that when any one of $R_1$, $R_2$, $R_3$, $R_4$ or $R_5$ is halogen, nitro, acetamido or cyano, and D is —O—, then E is not methylene;

G is a dialkylamino group having the structure:

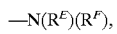

wherein:
$R^E$ is hydrogen or a lower alkyl, and
$R^F$ is hydrogen or lower alkyl, or
$R^E$ and $R^F$ combine to form a 3–7 membered ring (with 4–6 membered rings being presently preferred),
with the proviso that when G is dialkylamino, B is absent, D is —O—, and E is $C_{1-3}$ alkylene, then at least one of $R^1$ and $R^5$ is not alkyl, substituted alkyl, cycloalkyl or substituted cycloalkyl, or G is a nitrogen-containing cyclic moiety having the structure:

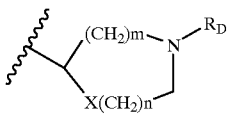

as well as bicyclic-derivatives thereof,
wherein:
m is 0–2,
n is 0–3,
X is optionally present, and when present is selected from —O—, —CH$_2$O—, —S—, —CH$_2$S—, —S(O)—, —CH$_2$S(O)—, —S(O)$_2$—, —CH$_2$S(O)$_2$— or —CH$_2$N—, wherein n is not 0 when X is not present, and
$R^D$ is selected from hydrogen, lower alkyl or lower cycloalkyl, or $R^D$ is absent when the nitrogen atom to which it is attached participates in the formation of a double bond,
with the proviso that:
when B is not present, D is —O—, E is a $C_{1-3}$ alkylene, and G is a nitrogen-containing cyclic moiety wherein X is not present, then m and n combined≠1; and
when B is not present, D is —S—, E is —CH$_2$CH$_2$—, G is a nitrogen-containing cyclic moiety wherein X is not present, m is zero, n is one and $R^D$ is CH$_3$, and each of $R_1$, $R_2$, $R_4$ and $R_5$ is H, then $R_3$ is not H, Cl or tert-butyl; and
when B is not present, D is —C(O)O—, E is —CH$_2$—, and G is a nitrogen-containing cyclic moiety wherein X is not present, m is zero, n is one and $R^D$ is CH$_3$, then at least one of $R_1$, $R_2$, $R_3$, $R_4$ and $R^5$ is not H; and
when B is not present, D is —C(O)—, E is a $C_{1-3}$ alkylene, and G is dialkylamino, then $R^E$ and $R^F$ combined are not —(CH$_2$)$_5$—; and
when B is not present, D is —C(O)NR$_C$—, E is —CH$_2$CH$_2$—, and G is a nitrogen-containing cyclic moiety wherein X is not present, m is zero, n is 3 and $R_D$ is hydrogen or lower alkyl, then $R_1$ is not alkoxy, when each of $R_2$ and $R_5$ is H, $R_3$ is NH$_2$, and $R_4$ is halo.

Bicyclic derivatives of the above-described nitrogen-containing cyclic moieties include a wide variety of azabicycloalkanes, as described in greater detail hereinbelow.

As employed herein, "lower alkyl" refers to straight or branched chain alkyl radicals having in the range of about 1 up to 4 carbon atoms; "alkyl" refers to straight or branched chain alkyl radicals having in the range of about 1 up to 12 carbon atoms; "substituted alkyl" refers to alkyl radicals further bearing one or more substituents such as hydroxy, alkoxy (of a lower alkyl group), mercapto (of a lower alkyl group), aryl, heterocyclic, halogen, trifluoromethyl, pentafluoroethyl, cyano, cyanomethyl, nitro, amino, carboxyl, carbamate, sulfonyl, sulfonamide, and the like;

"lower alkylene" refers to straight or branched chain alkylene radicals (i.e., divalent alkyl moieties, e.g., methylene) having in the range of about 1 up to 4 carbon atoms; "alkylene" refers to straight or branched chain alkylene radicals having in the range of about 1 up to 12 carbon atoms; and "substituted alkylene" refers to alkylene radicals further bearing one or more substituents as set forth above;

"lower cycloalkyl" refers to cyclic radicals containing 3 or 4 carbon atoms, "substituted lower cycloalkyl"

refers to lower cycloalkyl radicals further bearing one or more substituents as set forth above, "cycloalkyl" refers to cyclic ring-containing radicals containing in the range of about 3 up to 8 carbon atoms, and "substituted cycloalkyl" refers to cycloalkyl radicals further bearing one or more substituents as set forth above;

"cycloalkylene" refers to cyclic ring-containing divalent radicals containing in the range of about 3 up to 8 carbon atoms (e.g. cyclohexylene), and "substituted cycloalkylene" refers to cycloalkylene radicals further bearing one or more substituents as set forth above;

"lower alkenyl" refers to straight or branched chain hydrocarbyl radicals having at least one carbon—carbon double bond, and having in the range of about 2 up to 4 carbon atoms, and "substituted lower alkenyl" refers to alkenyl radicals further bearing one or more substituents as set forth above;

"alkenyl" refers to straight or branched chain hydrocarbyl radicals having at least one carbon—carbon double bond, and having in the range of about 2 up to 12 carbon atoms (with radicals having in the range of about 2 to 6 carbon atoms presently preferred), and "substituted lower alkenyl" refers to alkenyl radicals further bearing one or more substituents as set forth above;

"lower alkenylene" refers to straight or branched chain alkenylene radicals (i.e., divalent alkenyl moieties, e.g., ethylidene) having at least one carbon—carbon double bond, and having in the range of about 2 up to 4 carbon atoms, and "substituted lower alkenylene" refers to divalent alkenyl radicals further bearing one or more substituents as set forth above;

"alkenylene" refers to straight or branched chain divalent alkenyl moieties having at least one carbon—carbon double bond, and having in the range of about 2 up to 12 carbon atoms (with divalent alkenyl moieties having in the range of about 2 to 6 carbon atoms presently preferred), and "substituted lower alkenylene" refers to divalent alkenyl radicals further bearing one or more substituents as set forth above;

"lower alkynyl" refers to straight or branched chain hydrocarbyl radicals having at least one carbon-carbon triple bond, and having in the range of about 2 up to 4 carbon atoms, and "substituted lower alkynyl" refers to alkynyl radicals further bearing one or more substituents as set forth above;

"alkynyl" refers to straight or branched chain hydrocarbonyl radicals having at least one carbon-carbon triple bond, and having in the range of about 2 up to 12 carbon atoms (with radicals having in the range of about 2 up to 6 carbon atoms presently being preferred), and "substituted alkynyl" refers to alkynyl radicals further bearing one or more substituents as set forth above;

"lower alkynylene" refers to straight or branched chain alkynylene radicals (i.e., divalent alkynyl moieties, e.g., ethynylidene) having at least one carbon—carbon triple bond, and having in the range of about 2 up to 4 carbon atoms, and "substituted lower alkynylene" refers to divalent alkynyl radicals further bearing one or more substituents as set forth above;

"alkynylene" refers to straight or branched chain divalent alkynyl moieties having at least one carbon—carbon triple bond, and having in the range of about 2 up to 12 carbon atoms (with divalent alkynyl moieties having in the range of about 2 to 6 carbon atoms presently being preferred), and "substituted alkynylene" refers to divalent alkynyl radicals further bearing one or more substituents as set forth above;

"aryl" refers to aromatic radicals having in the range of 6 up to 14 carbon atoms and "substituted aryl" refers to aryl radicals further bearing one or more substituents as set forth above;

"alkylaryl" refers to alkyl-substituted aryl radicals and "substituted alkylaryl" refers to alkylaryl radicals further bearing one or more substituents as set forth above;

"arylalkyl" refers to aryl-substituted alkyl radicals and "substituted arylalkyl" refers to arylalkyl radicals further bearing one or more substituents as set forth above;

"arylalkenyl" refers to aryl-substituted alkenyl radicals and "substituted arylalkenyl" refers to arylalkynyl radicals further bearing one or more substituents as set forth above;

"arylalkynyl" refers to aryl-substituted alkynyl radicals and "substituted arylalkynyl" refers to arylalkynyl radicals further bearing one or more substituents as set forth above;

"aroyl" refers to aryl-carbonyl species such as benzoyl and "substituted aroyl" refers to aroyl radicals further bearing one or more substituents as set forth above;

"heterocyclic" refers to cyclic (i.e., ring-containing) radicals containing one or more heteroatoms (e.g., N, 0, S) as part of the ring structure, and having in the range of 3 up to 14 carbon atoms and "substituted heterocyclic" refers to heterocyclic radicals further bearing one or more substituents as set forth above;

"azabicycloalkanes" refers to bicyclic species bearing a nitrogen atom at one of the ring positions. Examples of azabicyclic moieties contemplated for use in the practice of the present invention include 7-azabicyclo[2.2.1]heptane, 8-azabicyclo[3.2.1]octane, 1-azabicyclo[2.2.2]octane, 9-azabicyclo[4.2.1]nonane, and the like; and "halogen" refers to fluoride, chloride, bromide or iodide radicals.

In accordance with the present invention, A is a phenyl or substituted phenyl moiety, optionally bearing substituents at $C_2$–$C_6$ of the phenyl ring. Thus, each of $R_1$ through $R_5$ are independently selected from hydrogen, halogen, cyano, cyanomethyl, nitro, alkyl, substituted alkyl, cycloalkyl, substituted cycloalkyl, alkenyl, substituted alkenyl, alkynyl, substituted alkynyl, aryl, substituted aryl, alkylaryl, substituted alkylaryl, arylalkyl, substituted arylalkyl, heterocyclic, substituted heterocyclic, perfluoro alkyl (such as, for example, trifluoromethyl, pentafluoroethyl, and the like), —$OR_A$, —O—C(O)—$R_A$, —O—C(O)—N($R_A$)$_2$, —$SR_A$, —NHC(O)$R_A$ or —NHSO$_2$$R_A$, wherein $R_A$ is selected from H, lower alkyl, substituted lower alkyl, aryl or substituted aryl, or —NR$_B$R$_B$, wherein each $R_B$ is independently selected from hydrogen and lower alkyl, and wherein at least one of $R_1$, $R_2$, $R_3$, $R_4$ or $R_5$ is not hydrogen.

Preferred compounds are those in which $R_1$ through $R_5$ are each selected from hydrogen, halogen, alkyl, substituted alkyl (including perfluoroalkyl), alkynyl, substituted alkynyl, —$OR_A$ or —$SR_A$, wherein $R_A$ is selected from H, lower alkyl or aryl, or —NR$_B$R$_B$, wherein each $R_B$ is independently selected from hydrogen or lower alkyl. More preferably each of $R_1$ through $R_5$ are independently selected from hydrogen, lower alkyl, halogen, hydroxyl, hydroxymethyl, alkoxy, amino, and the like.

In accordance with the present invention, B is selected from straight chain lower alkylene and substituted lower alkylene moieties, or cycloalkylene and substituted cycloalkylene, or lower alkenylene and substituted alkenylene moieties, or lower alkynylene moieties. Presently preferred moieties for B are lower alkylene chains containing 1 to 3 carbon atoms in the backbone thereof.

Further in accordance with the present invention, D is selected from —O—, —C(O)—, —C(O)O—, —S—, —S(O)—, —S(O)$_2$— or —C(O)NR$_C$—, wherein R$_C$ is selected from hydrogen, lower alkyl or substituted lower alkyl. Preferably D is selected from —O—, —S—, —C(O)O— or —S(O)$_2$—. It is presently especially preferred that D is selected from —S— or —C(O)O—.

Still further in accordance with the present invention, E is selected from straight chain lower alkylene and substituted lower alkylene moieties (preferably having up to 3 atoms in the backbone thereof), or lower alkenylene moieties (preferably having about 3 atoms in the backbone thereof), or substituted lower alkenylene moieties and lower alkynylene moieties (preferably having about 3 atoms in the backbone thereof). Presently preferred moieties for E are lower alkylene of 1 to 3 carbon atoms. It is also preferred that when any one of R$_1$, R$_2$, R$_3$, R$_4$ or R5 is halogen, nitro, acetamido or cyano, and D is —O—, then E is not methylene.

Yet still further in accordance with the present invention, G is a dialkylamino group having the structure:

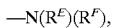

wherein:
R$^E$ is hydrogen or a lower alkyl, and
R$^F$ is hydrogen or lower alkyl, or
R$^E$ and R$^F$ combine to form a 3–7 membered ring (with 4–6 membered rings being presently preferred), or
G is a nitrogen-containing cyclic moiety having the structure:

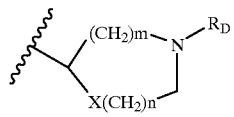

as well as bicyclic-derivatives thereof,
wherein:
m is 0–2,
n is 0–3,
X is optionally present, and when present is selected from —O—, —CH$_2$O—, —S—, —CH$_2$S—, —S(O)—, —CH$_2$S(O)—, —S(O)$_2$—, —CH$_2$S(O)$_2$— or —CH$_2$N—, wherein n is not 0 when X is not present, and
R$_D$ is selected from hydrogen, lower alkyl or lower cycloalkyl, or R$_D$ is absent when the nitrogen atom to which it is attached participates in the formation of a double bond.

Thus, for example, G can be a dialkylamino moiety, an aziridino moiety, azetidino moiety, tetrahydrooxazolo moiety, tetrahydrothiazolo moiety, pyrrolidino moiety, piperidino moiety, morpholino moiety, thiomorpholino moiety, piperazino moiety, an azabicycloalkane, and the like. Presently preferred compounds include those wherein G is an azetidino moiety, pyrrolidino moiety, 1-methylpyrrolidino moiety, 7-azabicyclo[2.2.1]heptane, 8-azabicyclo[3.2.1] octane, 1-azabicyclo[2.2.2]octane, 9-azabicyclo[4.2.1] nonane, and the like.

Preferred compounds of the present invention include those wherein D is —S—; A is 4-hydroxyphenyl, 2-fluoro-4-hydroxyphenyl, 2-chloro-4-hydroxyphenyl or 3-fluoro-4-methoxyphenyl; B is absent; E is lower alkylene; and, G forms a 4-, 5- or 6-membered heterocyclic ring. Particularly preferred compounds of the present invention include those wherein D is —S—; A is 4-hydroxyphenyl, 2-chloro-4-hydroxyphenyl or 3-fluoro-4-methoxyphenyl; B is absent; E is ethylene; and G is pyrrolidino or 1-methylpyrrolidino.

Additional preferred compounds of the present invention include those wherein D is —C(O)O—; A is phenyl, 4-hydroxyphenyl or 4-aminophenyl; B is ethylene or propylene; E is methylene; and G is pyrrolidino or 1-methylpyrrolidino.

Additional preferred compounds of the invention include those wherein D is —S—; B is not present; E is ethylene; G is pyrrolidino; and A is 2-methyl-4-hydroxyphenyl, 4-(NHSO$_2$-R$_A$)-phenyl (wherein R$_A$ is —CH$_3$ or —CF$_3$), 4-amino (toluenesulfonate)phenyl, 4-methylacetate phenyl, 4-carboxyphenyl, 4-(O—C(O)—N(CH$_3$)H)phenyl, 4-(CH$_2$— NHSO$_2$—R$_A$)-phenyl (wherein R$_A$ is lower alkyl, aryl or —CF$_3$), or 4-(NH—SO$_2$—N(R$_A$)$_2$)phenyl (wherein R$_A$ is lower alkyl, aryl or —CF$_3$).

Additional preferred compounds of the invention include those wherein D is —O—; B is methylene or not present; E is methylene; G is pyrrolidino; and A is 4-hydroxyphenyl, 4-aminophenyl, or 4-(NHSO$_2$—R$_A$)-phenyl (wherein R$_A$ is lower alkyl, aryl or —CF$_3$).

Additional preferred compounds of the invention include those wherein D is —S—; B is methylene or not present; E is methylene; and A is an R-substituted phenyl (wherein R is defined the same as any one of R$^1$, R$^2$, R$^3$, R$^4$ or R$^5$, e.g., 4-hydroxyphenyl, 4-methoxyphenyl, and the like).

Additional preferred compounds of the invention include those wherein D is —S—; neither B nor E are present; G is 1-methyl-4-piperidino; and A is 4-hydroxyphenyl; as well as compounds wherein D is —S—; B is not present; E is methylene; A is hydroxyphenyl; and G is 7-azabicyclo [2.2.1]heptane, N-methyl 7-azabicyclo[2.2.1]heptane, 8-azabicyclo[3.2.1]octane, N-methyl 8-azabicyclo[3.2.1] octane, 1-azabicyclo[2.2.2]octane, N-methyl 1-azabicyclo [2.2.2]octane, 9-azabicyclo[4.2.1]nonane, or N-methyl 9-azabicyclo[4.2.1]nonane.

Additional preferred compounds of the invention include those wherein D is —S—; B is not present; E is —(CH$_2$)$_n$—, wherein n=1–6, e.g., methylene, ethylene, propylene, butylene, and the like; A is 4-hydroxyphenyl; and G is dialkylamino (e.g., dimethylamino), pyrrolidino, piperidino, 7-azabicyclo[2.2.1]heptano, 8-azabicyclo[3.2.1]octano, 1-azabicyclo[2.2.2]octano or 9-azabicyclo[4.2.1]nonano.

In the following reaction Schemes, each of A, B, D, E and G are as defined above. When any one or more of the R-group substituents of A (i.e., R$_1$, R$_2$, R$_3$, R$_4$ or R$_5$ are —OH or —SH, it will be readily apparent to those of skill in the art that this functional group may require the use of "protecting groups" (e.g., t-butyldimethylsilyl (t-BDMS), benzyl (B$_n$) or tetrahydrophenyl (THP), and the like) during the coupling reaction to "block" the reactivity of the R group. Similarly, when the R-group of A is —NH$_2$, protecting groups (e.g., 9-fluoromethylcarbonyl (FMOC), butoxycarbonyl (BOC), benzoyloxycarbonyl (CBZ), and the like) may be required. Furthermore, when G=pyrrolidine (i.e., R$_D$=H), an additional protecting step may be required. For such purpose, BOC, CBZ, and the like can be employed. Hence, subsequent deprotection will be required prior to analysis.

Alternative methods for the preparation of compounds having the general Formula Z, as follows:

A—B—D—E—G (Z)

as described herein above, wherein D is present and represents an ester linking moiety (i.e., —C(O)O—), are shown in Reaction Schemes I, II and III. In Reaction Scheme I, compounds of Formula I, wherein B is absent or selected from methylene or ethylene, are commercially available and are well known to those of skill in the art. Those compounds not currently available may readily be prepared from starting materials well-known to those of kill in the art.

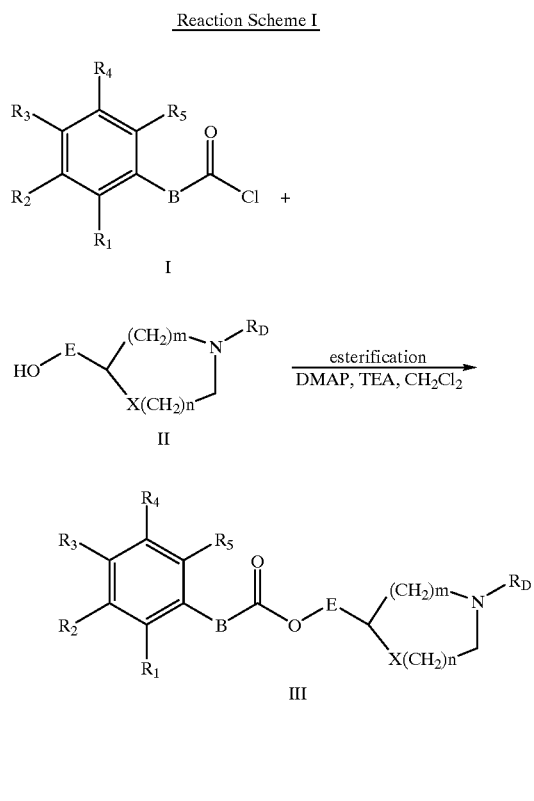

Reaction Scheme I

In Reaction Scheme I, the aryl acid chlorides of Formula I are effectively contacted with the primary alcohol compounds of Formula II, optionally bearing E, and dimethylaminopyridine (DMAP) under anhydrous conditions in an aprotic solvent, such as, for example, methylene chloride (CH$_2$Cl$_2$), tetrahydrofuran (THF), ether, diethyl ether, benzene, toluene, and the like. Compounds of Formula II are commercially available, or can be prepared from readily available starting materials, employing techniques well-known to those of skill in the art. See, for example, Kreug and Reinecke, *J. Org. Chem.* 32:225 (1967); Eremeev et al., *Chem. Heterocycl. Compd.* (English Translation) 22:1039–1044 (1986); Morie et al., *J. Chem. Soc. Perkin Trans.* 1:2565–2570 (1994); Habermehl and Ecsy, *Heterocycles* 7:1027–1032 (1977); and Brown et al., *J. Chem. Soc. Perkin Trans.* 1:2577–2580 (1985)). Similarly, hydroxy derivatives of dialkylamines or azabicyloalkanes can be used instead of compounds of Formula II. The reaction mixtures are stirred for 1 to 16 hr, with 4 hours preferred, at reaction temperatures within the range of −78° C. up to ambient, with ambient temperatures presently preferred. The resulting esters (Formula III) are typically purified, e.g., by chromatography over silica, and the final product analyzed by NMR.

Alternatively, compounds of Formula III may be prepared by the trans-esterification reaction described in Reaction Scheme II.

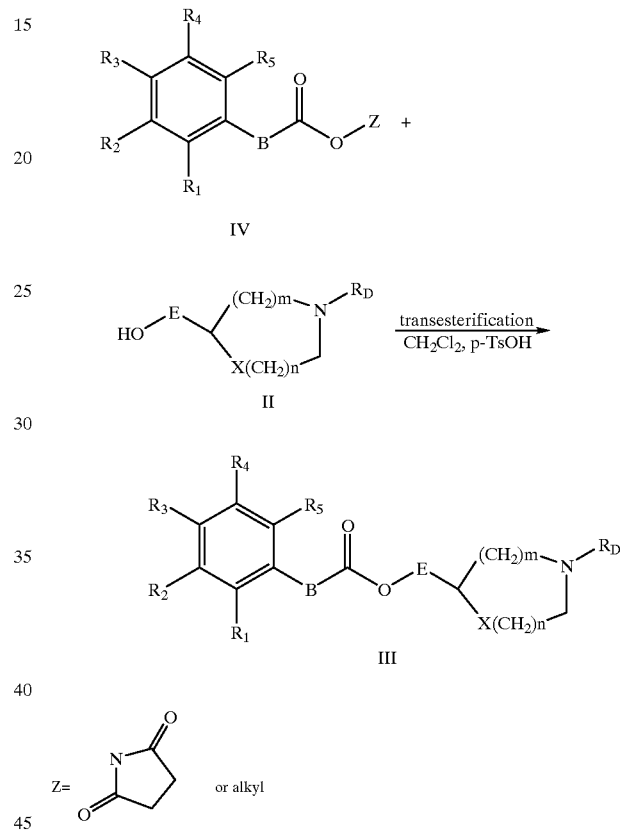

Reaction Scheme II

In Reaction Scheme II, aryl esters of Formula IV, optionally containing B, are effectively contacted with compounds of Formula II, optionally bearing E, in the presence of an aprotic solvent (e.g., methylene chloride or benzene) and a catalytic amount of p-toluenesulfonic acid (p-TsOH), to afford the ester compounds of Formula III. Similarly, hydroxy derivatives of dialkylamines or azabicyloalkanes can be used instead of compounds of Formula II. The reaction mixture is refluxed (i.e., boiled) in the range of 8 to 16 hours, with 12 hours presently preferred, and the resulting ester is purified and analyzed by NMR.

Further, compounds of Formula III may be prepared from aryl carboxylic acid derivatives according to Reaction Scheme III.

as described hereinabove, wherein D is a thioether.

Reaction Scheme III

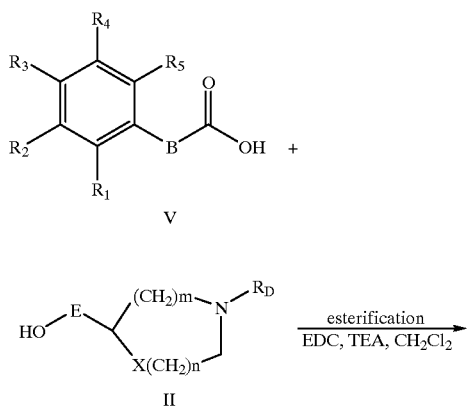

Reaction Scheme IV

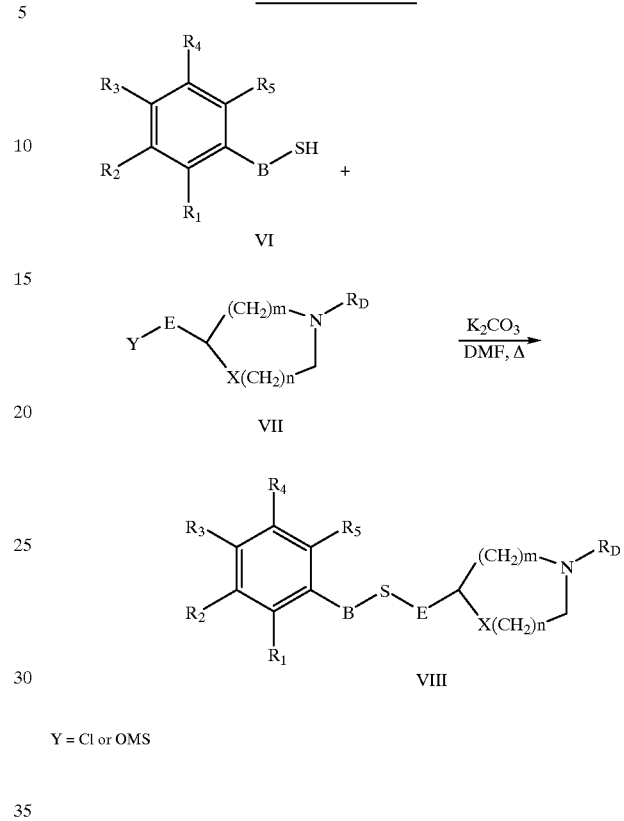

Y = Cl or OMS

Carboxylic acid derivatives V employed in Reaction Scheme III are commercially available or may readily be prepared from well-known starting materials. Compounds of Formula V are coupled with compounds of Formula II in the presence of triethylamine (TEA), 1-(3-dimethylaminopropyl)-3-ethylcarbodiimide (EDC) in an aprotic solvent such as methylene chloride ($CH_2Cl_2$) or chloroform and the like. Similarly, hydroxy derivatives of dialkylamines or azabicyloalkanes can be used instead of compounds of Formula II. The reaction mixtures are stirred for 8 to 16 hr, with 12 hr preferred, at reaction temperatures within the range of −78° C. to ambient, with ambient temperatures presently preferred, to afford compounds III. The resulting esters are typically purified by chromtography over silca and the final product analyzed by NMR.

Reaction Scheme IV illustrates the preparation of compounds having the general Formula Z, as follows:

A—B—D—E—G        (Z)

In reaction Scheme IV the sulfhydryl derivatives of A, and A optionally bearing B, (compounds VI) are commercially available (e.g., thiophenyl, 4-hydroxythiophenyl and 2-phenylethanethiol, Aldrich Chemical Co.) or may readily be prepared by those of skill in the art by selecting the appropriate A moiety.

In Reaction Scheme IV, the sulfur compounds (compounds VI) are effectively contacted with the chloride derivatives of G, optionally bearing E. Compounds VII are commercially available or may be prepared from starting materials well-known to those of skill in the art (see e.g., Wrobel and Hejchman, *Synthesis* 5:452 (1987) or Gautier et al., *Am. Pharm. Fr.* 30:715 (1972)) or, alternatively, the mesylate derivative of compounds II may be used (as prepared according to Fürst and Koller (1947) Helv. Chim. Acta 30, 1454). Similarly, chloro or mesylate derivatives of dialkylamines or azabicycloalkanes can be used instead of compounds of Formula VII. This coupling reaction is promoted by suitable base, such as, for example potassium hydroxide, sodium ethoxide, potassium carbonate, 1,8-diazatricyclo[5.4.0]undec-7-ene (DBU), and the like. Presently preferred base for use in the practice of the present invention is potassium carbonate. The above-desired reaction is typically carried out in a solvent such as methanol, tetrahydrofuran (THF), dimethylformamide (DMF), and the like. Presently preferred solvent for use in the practice of the present invention is dimethylformamide (DMF).

Typically the coupling reaction can be carried out over a wide range of temperatures. Temperatures in the range of about 80° C. are presently preferred. Reaction times required to effect the desired coupling reaction can vary widely, typically falling in the range of 10 minutes up to about 24 hours. Preferred reaction times fall in the range of about 30 minutes to one hour. The resulting sulfur compound is purified and analyzed by NMR.

Alternative methods for the preparation of compounds having the general Formula Z, as follows:

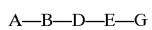  (Z)

as described hereinabove, wherein D is present and represents a sulfoxide linking moiety (—S(O)—) or a sulfone linking moiety (—S(O)$_2$—), are shown in reaction Scheme V.

minutes to one hour. The resulting sulfoxides (compound IX) are purified and analyzed by NMR.

Alternatively, in step B of Reaction Scheme V, the thioether derivatives (compounds VIII) may be oxidized to their corresponding sulfones (compounds X) using procedures similar to those described above for preparing sulfoxides, but employing elevated levels of oxidant and/or elevated reaction temperatures. In the present invention, hydrogen peroxide in acetic acid under reflux is the preferred condition (R. Gaul et al., *J. Org. Chem.* 26:5103 (1961)). The resulting sulfones (compounds X) are purified and analyzed by NMR.

Alternative methods for the preparation of compounds having the general Formula Z, as follows:

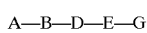  (Z)

as described hereinabove, wherein D is not present, are shown in Reaction Scheme VI.

Reaction Scheme V

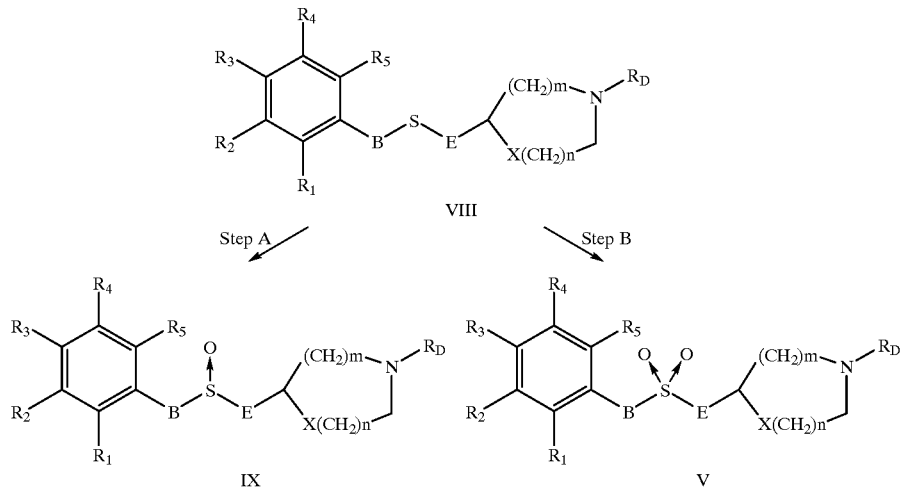

In step A, the resulting thioether derivatives produced, for example, as described in Reaction Scheme IV (compounds VIII), may be oxidized to their corresponding sulfoxides (compounds IX) using about one to about five equivalents of a suitable oxidant, such as, for example, hydrogen peroxide, peracids (such as 3-chloroperbenzoic acid), halogen oxide derivatives (such as sodium metaperiodate), N-halogenated derivatives (such as N-bromo or N-chlorosuccidimide), and the like (for a review see M. Madesclaire, *Tetrahedron* 42:5459 (1985)). Presently preferred oxidant for use in the practice of the present invention is (about three equivalents of) hydrogen peroxide. The above-described reaction is typically carried out in a solvent such as methylene chloride, acetic acid, dioxane, ethanol, methanol, and the like. Presently preferred solvent for use in the practice of the present invention is acetic acid.

Typically the coupling reaction can be carried out over a wide range of temperatures, typically following in the range of about −78° C. up to reflux. Temperatures in the range of about 22° C. are presently preferred. Reaction times required to effect the desired oxidation reaction can vary widely, typically falling in the range of 10 minutes up to about 24 hours. Preferred reaction times fall in the range of about 30

Reaction Scheme VI

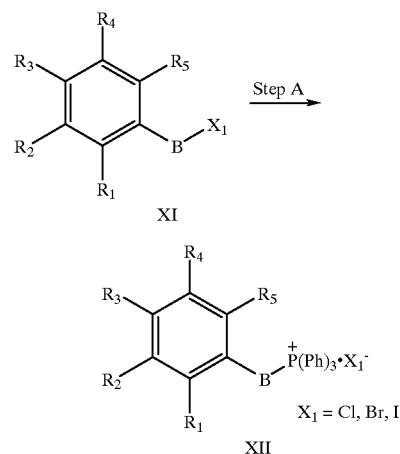

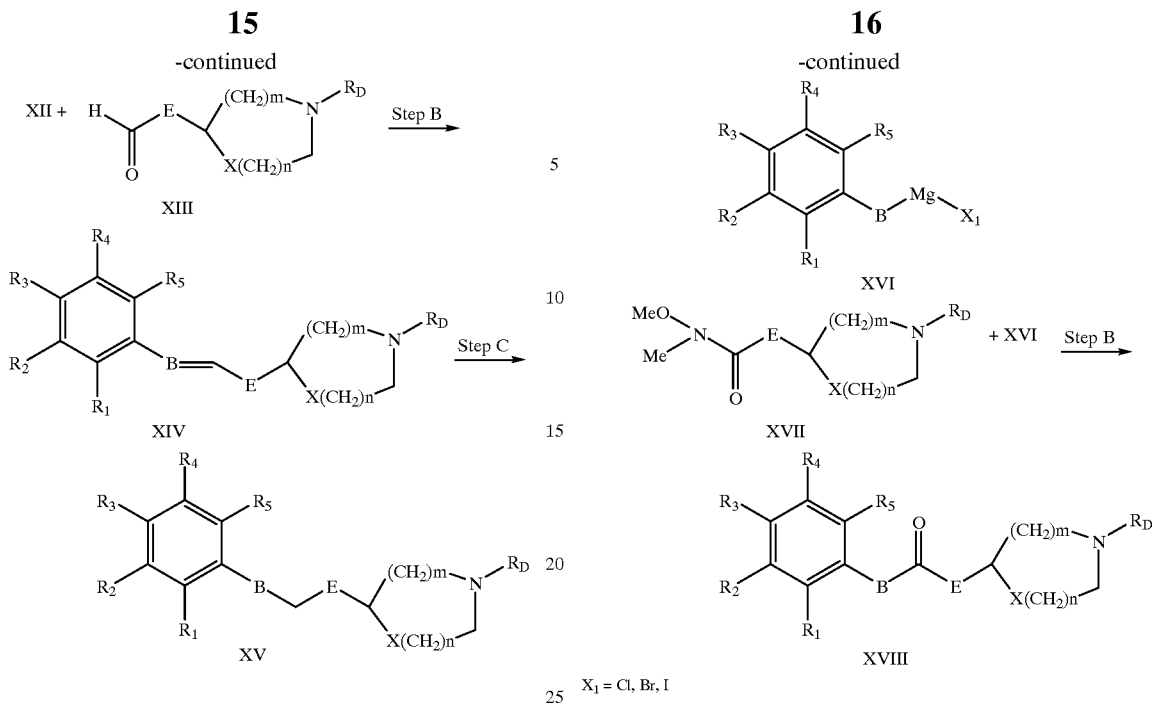

As illustrated in Reaction Scheme VI, halogenated derivatives of A (compounds XI), are reacted with triphenyl phosphine in an aprotic solvent such as benzene, toluene, acetonitrile and the like, forming the corresponding phosphonium salts (compounds XII). Typically this reaction may be carried out over a wide range of temperatures. Temperatures in the range of about 80° C. are presently preferred. Reaction times required to effect the desired coupling reaction can vary widely, typically falling in the range of 10 minutes up to about 24 hours. Preferred reaction times fall in the range of 12 hours. The resulting compounds are purified and analyzed by NMR.

In Step B of Reaction Scheme VI, the phosphonium salts (compounds XII) are alternatively contacted with an appropriate aldehyde (e.g., compounds XIII, optionally bearing B, or aldehyde derivatives of azabicycloalkanes), via a Wittig reaction well-known to those of skill in the art to afford compounds XIV. Compounds XIII are commercially available or can be readily prepared by oxidation of the corresponding alcohol (i.e., compounds of Formula II, see Reaction Scheme I).

In Step C of Reaction Scheme VI, the resulting alkenylene-linker derivatives (compounds XIV) may be reduced to their corresponding saturated alkylene derivatives using procedures well known to those of skill in the art, such as exposure to hydrogen using a Pd/C catalyst.

Alternative methods for the preparation of compounds wherein D is a ketone (i.e., —C(O)—) are shown in Reaction Schemes VII and VIII.

Reaction Scheme VII

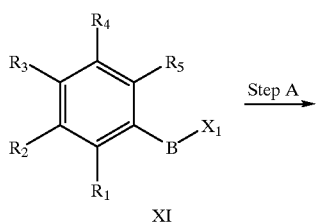

As illustrated in Step A of Reaction Scheme VII, halogenated derivatives of A, optionally bearing B (compounds XI) are commercially available (e.g., phenylchloride, Aldrich Chemical Co.), or may readily be prepared by those of skill in the art, are reacted with magnesium in an aprotic solvent such as ether, tetrahydrofuran, benzene and the like, forming the corresponding Grignard reagent (compounds XVI). Presently preferred solvent for use in the practice of the present invention is tetrahydrofuran. Typically this reaction may be carried out over a wide range of temperatures. Temperatures in the range of about 65° C. are presently preferred. Reaction times required to effect the desired reaction can vary widely, typically falling in the range of one hour to about 12 hours. Preferred reaction times fall in the range of 2 hours.

In step B of Reaction Scheme VI, compound XVII (see Scheme VII) can be contacted with Grignard reagent XVI to afford ketones XVIII (see S. Nahm and S. Weinreb, *Tet lett* 22:3815 (1981)). Typically this reaction may be carried out in an aprotic solvent such as tetrahydrofuran, ether and the like. Presently preferred solvent for use in the practice of the present invention is tetrahydrofuran. Typically this reaction may be carried out over a wide range of temperatures. Temperatures in the range of 0° C. are presently preferred. Reaction times required to effect the desired coupling can vary widely, typically in the range of one hour. The resulting products are purified and analyzed by NMR.

A method for the preparation of compounds of Formula XVII is depicted in Scheme VIII.

Reaction Scheme VIII

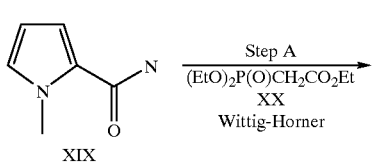

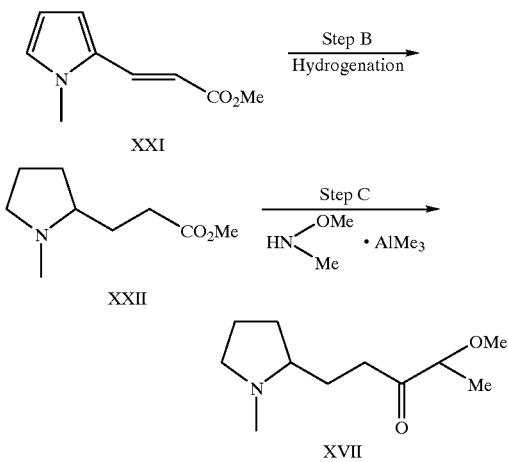

In Step A of reaction Scheme VIII, aldehyde XIX is contacted with triethyl phosphonoacetate XX, via a Wittig-Horner reaction well known to those of skill in the art in order to obtain the unsaturated ester (compound XXI).

In step B of reaction Scheme VIII the resulting unsaturated ester (compound XXI) may be reduced to the corresponding saturated ester (compound XVII) using procedures well known to those of skill in the art, such as catalytic hydrogenation using a pressure of hydrogen, a catalyst such as $PtO_2$ and acetic acid as solvent.

In Step C of the reaction Scheme VIII the saturated ester (compound XXII) is contacted with N-methoxy-N-methylamine in the presence of trimethylaluminium in an aprotic solvent such as benzene in order to form the corresponding amide (compound XVII) (Levin et al., *Synt. Com.* 12:989 (1982)).

In addition to the above-described synthetic procedures, those of skill in the art have access to numerous other synthetic procedures which can be employed for the preparation of invention compounds. Indeed, the literature is replete with methodologies that can be used for the preparation of starting and/or intermediate compounds which are useful for the preparation of invention compounds (e.g., compounds having Formula II, VI, IX, XI, XIV, XVII, XXII, and the like). Such starting and/or intermediate compounds can then be modified, for example, as described herein, to introduce the necessary substituents to satisfy the requirements of Formula I.

In accordance with another embodiment of the present invention, there are provided pharmaceutical compositions comprising substituted aryl compounds as described above, in combination with pharmaceutically acceptable carriers. Optionally, invention compounds can be converted into non-toxic acid addition salts, depending on the substituents thereon. Thus, the above-described compounds (optionally in combination with pharmaceutically acceptable carriers) can be used in the manufacture of a medicament for modulating the activity of acetylcholine receptors.

Pharmaceutically acceptable carriers contemplated for use in the practice of the present invention include carriers suitable for oral, intravenous, subcutaneous, transcutaneous, intramuscular, intracutaneous, inhalation, and the like administration. Administration in the form of creams, lotions, tablets, dispersible powders, granules, syrups, elixirs, sterile aqueous or non-aqueous solutions, suspensions or emulsions, patches, and the like, is contemplated. Also contemplated is single dose administration, sustained release administration (e.g., employing time release formulations, metered delivery, repetitive administration, continuous delivery, and the like), administration in combination with other active ingredients, and the like.

For the preparation of oral liquids, suitable carriers include emulsions, solutions, suspensions, syrups, and the like, optionally containing additives such as wetting agents, emulsifying and suspending agents, sweetening, flavoring and perfuming agents, and the like.

For the preparation of fluids for parenteral administration, suitable carriers include sterile aqueous or non-aqueous solutions, suspensions, or emulsions. Examples of non-aqueous solvents or vehicles are propylene glycol, polyethylene glycol, vegetable oils, such as olive oil and corn oil, gelatin, and injectable organic esters such as ethyl oleate. Such dosage forms may also contain adjuvants such as preserving, wetting, emulsifying, and dispersing agents. They may be sterilized, for example, by filtration through a bacteria-retaining filter, by incorporating sterilizing agents into the compositions, by irradiating the compositions, or by heating the compositions. They can also be manufactured in the form of sterile water, or some other sterile injectable medium immediately before use.

Invention compounds can optionally be converted into non-toxic acid addition salts. Such salts are generally prepared by reacting the compounds of this invention with a suitable organic or inorganic acid. Representative salts include the hydrochloride, hydrobromide, sulfate, bisulfate, methanesulfonate, acetate, oxalate, valerate, oleate, laurate, borate, benzoate, lactate, phosphate, tosylate, citrate, maleate, fumarate, succinate, tartrate, napsylate, and the like. Such salts can readily be prepared employing methods well known in the art.

In accordance with yet another embodiment of the present invention, there are provided methods of modulating the activity of acetylcholine receptors, said method comprising:

contacting cell-associated acetylcholine receptors with a concentration of a pyridine compound as described above sufficient to modulate the activity of said acetylcholine receptors.

As employed herein, the phrase "modulating the activity of acetylcholine receptors" refers to a variety of therapeutic applications, such as the treatment of Alzheimer's disease and other disorders involving memory loss and/or dementia (including AIDS dementia); cognitive dysfunction (including disorders of attention, focus and concentration), disorders of extrapyramidal motor function such as Parkinson's disease, progressive supramuscular palsy, Huntington's disease, Gilles de la Tourette syndrome and tardive dyskinesia; mood and emotional disorders such as depression, panic, anxiety and psychosis; substance abuse including withdrawal syndromes and substitution therapy; neuroendocrine disorders and dysregulation of food intake, including bulimia and anorexia; disorders of nociception and control of pain; autonomic disorders including dysfunction of gastrointestinal motility and function such as inflammatory bowel disease, irritable bowel syndrome, diarrhea, constipation, gastric acid secretion and ulcers; pheochromocytoma; cardiovascular dysfunction including hypertension and cardiac arrhythmias, comedication in surgical procedures, and the like.

The compounds of the present invention are especially useful for the treatment of Alzheimer's disease as well as other types of dementia (including dementia associated with AIDS), Parkinson's disease, cognitive dysfunction (including disorders of attention, focus and concentration), attention deficit syndrome, affective disorders, and for the control of pain. Thus modulation of the activity of acetylcholine receptors present on or within the cells of a patient suffering from any of the above-described indications will impart a therapeutic effect.

As employed herein, the phrase "an effective amount", when used in reference to compounds of the invention, refers to doses of compound sufficient to provide circulating concentrations high enough to impart a beneficial effect on the recipient thereof. Such levels typically fall in the range of about 0.001 up to 100 mg/kg/day; with levels in the range of about 0.05 up to 10 mg/kg/day being preferred.

The invention will now be described in greater detail with reference to the following non-limiting examples. All references cited herein are hereby incorporated by reference.

EXAMPLE 1

Synthesis of Invention Ester Compounds Via Synthetic Scheme I

Formation of ester, Method A:

Into a three-neck, round-bottom flask fitted with an addition funnel, a condenser and flushed with argon was placed compound II, 2 mL/mmole of dry methylene chloride, triethylamine (1.1 eq.) and a catalytic amount of dimethylaminopyridine. To this mixture the acylchloride I (1.05 eq.) was added slowly at 0° C. The mixture was allowed to warm to room temperature and the reaction was monitored by thin layer chromatography (TLC). After completion, the reaction mixture was poured into water. The aqueous layer was basified with sodium carbonate and extracted three times with 3–4 mL/mmole of methylene chloride. The organic phases were combined, washed with 4–5 mL/mmole of brine, dried (MgSO$_4$) and concentrated under vacuum (15 mm Hg) to give an oil which was purified via chromatography on silica using a gradient of chloroform and methanol as eluant.

1-Methyl-2-pyrrolidinemethyl phenethylacetate (Method A):

(s)-(–)-1-Methyl-2-pyrrolidinemethanol (2.00 g, 17.4 mmole), triethylamine (1.93 g, 2.66 mL, 19.1 mmole), dimethylaminopyridine (0.01 g) and phenylacetyl chloride (2.81 g, 2.4 mL, 18.2 mmole) were stirred for 10 min at room temperature, yielding 1.01 g (4.32 mmole, 24%) of the desired compound. $^1$H NMR (300 MHz, CD$_3$Cl) δ 7.28 (m, 5H), 4.07 (m, 2H), 3.65 (s, 1H), 3.02 (m, 1H), 2.45 (m, 1H), 2.35 (m, 3H), 2.29 (m, 1H), 1.85 (m, 1H), 1.7 (m, 1H), 1.55 (m, 2H); $^{13}$C NMR (75.5 MHz, CD$_3$Cl) δ 171.5, 133.9, 129.2, 128.4, 126.9, 67.0, 63.6, 57.6, 41.3, 41.2, 28.2, 22.8.

1-Methyl-2-pyrrolidinemethyl 3-phenylpropionate (Method A):

(s)-(–)-1-Methyl-2-pyrrolidinemethanol (2.00 g, 17.4 mmole), triethylamine (1.93 g, 2.66 mL, 19.1 mmole), dimethyl-aminopyridine (0.01 g) and hydrocinnamoyl chloride (3.06 g, 2.7 mL, 18.2 mmole) were stirred for 10 min at room temperature, yielding 2.16 g (8.73 mmole, 50%) of the desired ester.

1-Methyl-2-pyrrolidinemethyl 3-phenylpropionate was converted to the fumarate salt (1.1 g, 3.03 mmole, 75%). $^1$H NMR (300MHz, CD$_3$OD) δ 7.23 (m, 5H), 6.68 (s, 2H), 4.40 (m, 1H), 4.27(m, 1H), 3.60 (m, 2H), 3.11 (m, 1H), 2.92(m, 2H), 2.86 (s, 3H), 2.68 (m, 2H), 2.23(m, 1H), 2.05(m, 2H), 1.80 (m, 1H); $^{13}$C NMR (75.5 MHz, CD$_3$OD) δ 174.1, 171.7, 142.2, 136.7, 130.0, 129.9, 127.8, 68.5, 63.2, 58.4, 41.3, 36.8, 32.1, 28.1, 23.5; mp 97–98° C.; CHN Analysis C$_{15}$H$_{21}$NO$_2$ 1.0(C$_4$H$_4$O$_4$).

EXAMPLE 2

Synthesis of Invention Ester Compounds via Synthetic Scheme II

1-Methyl-2-pyrrolidinemethyl 3-(4-hydroxyphenyl) propionate

Into a two neck, round-bottom flask fitted with a condenser and flushed with nitrogen was placed (S)-(–)-1-methyl-2-pyrrolidinemethanol (10.4 g, 3.5 mmoles), 3-(4-tertbutyldimethylsillylhydroxyphenyl propionic acid N-hydroxysuccinimide ester (1.2 g, 3.18 mmole), a catalytic amount of p-toluenesulfonic acid (0.02 g) and anhydrous methylene chloride (10 mL). The mixture was refluxed for 12 hours, hydrolyzed with water (20 mL) and extracted with methylene chloride (3×25 mL). The organic layers were combined, washed with about 50 mL of brine, dried (MgSO$_4$) and concentrated under vacuum (15 mm Hg). The crude material was purified via chromatography on silica using chloroform as eluant yielding 1.13 g of pure material (3.01 mmole, 91%). The alcohol was deprotected using 1.1 eq of tetrabutylammonium fluoride in THF at room temperature for 30 min. After an aqueous work-up, the crude material was purified via chromatography on silica using chloroform/methanol (99:1) as eluant yielding 0.33 g of the desired ester (1.25 mmole, 95%).

$^1$H NMR (300 MHz, CDCl$_3$) δ 6.92 (d, J=7 Hz, 2H), 6.68 (d, J=7 Hz, 2H) 4.12 (t, J=7 Hz, 2H), 3.14 (m, 1H), 2.78 (m, 2H), 2.50 (m, 3H), 2.45 (s, 3H), 2.31 (m, 1H), 1.80 (m, 4H); $^{13}$C NMR (75.5 MHz, CD$_3$OD) δ 173.3, 155.2, 131.3, 129.4, 129.1, 115.6, 115.5, 65.1, 64.2, 57.4, 41.3, 35.9, 29.9, 7.6, 22.3; mp 114–115° C.; CHN Analysis: C$_{15}$H$_{21}$NO$_3$.

EXAMPLE 3

Synthesis of Invention Ester Compounds Via Synthetic Scheme III

1-Methyl-2-pyrrolidinemethyl 3-(4-aminophenyl) butanoate:

Into a two neck, round bottom flask fitted with a condenser and flushed with argon was placed (S)-(–)-1-methyl-2-pyrrolidine methanol (0.16 g, 1.43 mmole), 4-(4-tertbutyl-carbonylaminophenyl)butyric acid (0.40 g, 1.43 mmole), EDC (1-(3-dimethylaminopropyl)-3-ethylcarbodiimide as its HCl salt (0.28 g, 1.43 mmole), triethylamine (0.15 g, 0.20 mL, 1.43 mmole), and methylene chloride (15 mL). The reaction mixture was stirred at room temperature for 12 hours, hydrolyzed with water (20 mL) and extracted with methylene chloride (3×20 mL). The organic layers were combined, washed with 50 mL of brine, dried (MgSO$_4$) and concentrated under vacuum (15 mm Hg). The crude material was purified via chromatography on silica using chloroform/methanol (99:1) as eluant, giving 0.26 g of the protected compound (48%). The amine was deprotected by stirring the compound in trifluoracetic acid (2.5 mL) at room temperature for one hour. The solvent was removed under vacuum and the crude material was purified via chromatography on silica using chloroform/methanol (96:4) as eluant, yielding to 0.80 g (0.29 mmole, 40%) of the desired ester.

1-methyl-2-pyrrolidinedimethyl 3-(4-aminophenyl) butanoate (0.80 g, 0.29 mmole) was converted to the fumarate salt (0.50 g, 0.1 mmole, 34%). HNMR (300 MHz, CD$_3$OD) δ 6.81 (d, J=7 Hz, 2H), 6.58 (d, J=7 Hz, 2H), 6.57 (s, 4H), 4.26 (m, 1H), 4.1 (m, 1H), 3.48 (m, 4H), 3.02 (m, 1H), 2.78 (s, 3H), 2.39 (m, 2H) 2.22 (m, 2H), 2.14 (m, 1H), 192 (m, 1H), 1.74 (m, 2H); $^{13}$C NMR (75.5 MHz, CD$_3$OD) δ 116.4, 172.0, 146.6, 137.9, 135.9, 132.4, 120.0, 70.5, 69.1, 60.2, 43.1, 37.4, 36.0, 29.9., 29.7, 25.3; mp=65–70° C.

EXAMPLE 4

Synthesis of Invention Thioether Compounds Via Synthetic Scheme IV

Formation of thioether (Method B):

Into a two neck flask fitted with a condenser, a thermometer and flushed with argon was placed 2-(2-chloroethyl)-1-methylpyrrolidine (1 eq), potassium carbonate (10 eq) and dry dimethylformamide (2 mL/mmole). The reaction mixture was heated at 70° C. for 30 minutes, cooled to room temperature, and poured into 3 mL/mmole of a saturated solution of sodium bicarbonate (4 mL/mmole). The resulting mixture was extracted three times with 4 mL/mmole of ethyl acetate. The organic layers were combined, washed with brine, dried ($MgSO_4$) and concentrated under vacuum (0.01 mm Hg) to give an oil. The crude material was purified via chromatography on silica using a gradient of chloroform and methanol as eluant.

2-(2-Phenylthioethyl)-1-methylpyrrolidine (Method B):

2-(2-Chloroethyl)-1-methylpyrrolidine (1.30 g, 0.08 mmole), thiophenol (1.00 g, 9.08 mmole), potassium carbonate (12.56 g, 90.8 mmole) and DMF (18 mL) were combined, yielding 1.77 g (8.01 mmole, 89%) of the desired compound.

2-(2-Phenylthioethyl)-1-methylpyrrolidine (0.12 g, 0.54 mmole) was converted to the fumarate salt (0.17 g, 0.51 mmole, 94%). $^1$H NMR (300 MHz, $CD_3OD$) δ 7.40 (m, 2H), 7.29 (m, 2H), 7.22 (m, 2H), 6.67 (s, 2H), 3.62 (m, 1H), 3.40 (m, 1H), 3.12 (m, 2H), 2.95 (m, 1H), 2.81 (s, 3H), 2.35 (m, 1H), 2.21 (m, 3H), 1.8 (m, 2H); $^{13}$C NMR (75.5 MHz, $CD_3OD$) δ 171.5, 136.5, 136.3, 131.1, 130.3, 127.8, 68.8, 57.1, 39.5, 31.2, 30.8, 30.3, 22.4; mp 109–111° C.; C H N Analysis $C_{13}H_{19}NS$ 1.0($C_4H_4O_4$).

2-[2-(4-Hydroxyphenyl)thioethyl]-1-methylpyrrolidine (Method B):

2-(2-Chloroethyl)-1-methylpyrrolidine (2.0 g, 13.5 mmole), 4-hydroxythiophenol (1.7 g, 13.5 mmole), potassium carbonate (18.7 g, 135.4 mmole) and DMF (26 mL) were combined, yielding 1.42 g (5.98 mmole, 44%) of the desired compound.

2-[2-(4-Hydroxyphenyl)thioethyl]-1-methylpyrrolidine (0.20 g, 0.84 mmole) was converted to the hydrochloride salt (0.13 g, 0.47 mmole, 56%). $^1$H NMR (300 MHz, $CD_3OD$) δ 7.22 (m, 2H), 6.67 (m, 2H), 3.52 (m, 1H), 3.35 (m, 1H), 3.05 (m, 1H), 2.86 (m, 1H), 2.76 (s, 3H) 2.68 (m, 1H), 2.26 (m, 1H), 1.95 (m, 3H), 1.64 (m, 2H); $^{13}$C NMR (75.5 MHz, $CD_3OD$) δ 159.3, 136.0, 124.8, 117.7, 69.5, 57.7, 40.2, 33.8, 31.6, 30.8, 22.9; mp 144–146° C.; C H N analysis $C_{13}H_{19}NOS \cdot HCl$.

2-[2-(3,4-Dichlorophenyl)thioethyl]-1-methylpyrrolidine (Method B):

2-(2-Chloroethyl)-1-methylpyrrolidine (1.50 g, 10.26 mmole), 3,4-dichlorobenzenethiol (1.82 g, 10.1 mmole), potassium carbonate (14.03 g, 101.6 mmole) and DMF (20 mL) were combined, yielding 0.46 g (4.34 mmole, 43%) of the desired compound.

2-[2-(3,4-Dichlorophenyl)thioethyl]-1-methylpyrrolidine (0.46 g, 1.58 mmole) was converted to the hydrochloride salt 0.36 g (1.10 mmole, 69%). $^1$H NMR (300 MHz, $CD_3OD$) δ 7.45 (m, 1H), 7.38 (m, 1H), 7.22 (m, 1H), 3.54 (m, 1H), 3.35 (m, 1H), 3.05 (m, 2H), 2.90 (m, 1H), 2.78 (s, 3H), 2.30 (m, 1H), 1.78–2.13 (m, 5H); $^{13}$C NMR (75.5 MHz, $CD_3OD$) δ 136.7, 132.9, 131.0, 130.6, 130.2, 128.9, 68.1, 56.3, 38.8, 29.9, 29.7, 29.4, 21.4; mp 115–116° C.

2-[2-(3-Fluoro-4-methylphenyl)thioethyl]-1-methylpyrrolidine (Method B):

2-(2-Chloroethyl)-1-methylpyrrolidine (1.4 g, 9.48 mmole), 3-fluoro-4-methyoxythiophenol (1.5 g, 9.48 mmole), potassium carbonate (13.1 g, 94.8 mmole) and DMF (20 mL) were combined, yielding 1.90 g (7.03 mmole, 74%) of the desired compound.

2-[2-(3-Fluoro-4-methoxyphenyl)thioethyl]-1-methylpyrrolidine (0.905 g, 3.36 mmole) was converted to the fumarate salt 1.18 g (3.06 mmole, 91%). $^1$HNMR (300 MHz, $CD_3OD$) δ 7.12 (m, 2H), 6.95 (m, 1H), 6.57 (s, 2H), 3.55 (m, 1H), 3.32 (m, 1H), 2.97 (m, 2H) 2.78 (m, 1H), 2.73 (s, 3H), 2.23 (m, 1H), 1.97 (m, 3H), 1.88 (m, 2H); $^{13}$C NMR (75.5 MHz, $CD_3OD$) δ 171.11, 153.2 (d, J=20 Hz) 148.5 (d, J=10 Hz), 135.9, 129.0 (d, J=4 Hz) 127.1 (d, J=6 Hz) 120.0 (d, J=20 Hz), 114.9 (d, J=2 Hz), 68.45, 56.7, 56.5, 39.2, 32.36, 30.65, 30.0, 22.1; mp 104–105° C.

2-[2-(2-Chloro-4-hydroxyphenyl)thioethyl]-1-methylpyrrolidine (Method B):

2-(2-Chloroethyl)-1-methylpyrrolidine (2.85 g, 19.29 mmole), 2-chloro-4-hydroxythiophenol (3.1 g, 19.29 mmole), potassium carbonate (26.7 g, 192.9 mmole) and DMF (30 mL) were combined, yielding 3.2 g (11.77 mmole, 61%).

2-[2-(2-Chloro-4-hydroxyphenyl)-thioethyl]-1-methylpyrrolidine (0.575 g, 2.12 mmole) was converted to the fumarate salt (0.34 g, 0.78 mmole, 37%). $^1$HNMR (300 MHz, $CD_3OD$) δ 7.32 (d, J=7 Hz, 1H), 6.82 (d, J=2 Hz, 1H), 6.64 (dd, J=2 Hz and 7 Hz, 1H), 6.59 (s, 1.4H), 3.55 (m, 1H), 3.38 (m, 1H), 3.0 (m, 2H), 2.73 (s, 3H) 2.7 (m, 1H), 2.28 (m, 1H), 1.98 (m, 3H), 1.75 (m, 1H); $^{13}$C NMR (75.5 MHz, $CD_3OD$) δ 173.3, 161.7, 140.9, 138.7, 138.1, 124,8, 119.9, 118.0, 70.6, 59.0, 41.4, 34.0, 32.7, 32.1, 24.2; mp 134–135° C.; C H N analysis $C_{13}H_{18}ClNOS$ 1.4 ($C_4H_4O_4$).

EXAMPLE 5

Radioligand Binding $^3$H-Nicotine binding to rat cerebral membranes was performed according to modifications of the method of Flyn and Mash (*J. Neurochem.* 47:1948 (1986)). $^3$H-Nicotine (80 ci/mmol; New England Nuclear Corporation, Boston, Mass.) was used as the ligand for nicotinic acetylcholine receptor binding assays. All other reagents were purchased from the Sigma Chemical Co. (St. Louis, Mo.).

Male Sprague-Dawley rats (250–400 gm) were sacrificed by decapitation, the brains removed and the cerebral cortex dissected on ice. Synaptic membranes were prepared by homogenizing the cortical tissue in 20 volumes of ice-cold modified Tris buffer (50 mM Tris pH 7.4, 120 mM NaCl, 5 mM KCl, 2 mM EDTA, 1 mM PMSF) with a polytron (20 sec at setting 5–6) followed by centrifugation (15 min at 25,000×g) at 4° C. The resultant pellet was rehomogenized and centrifuged twice. The final pellet was resuspended in ice-cold assay buffer (50 mM Tris pH 7.4, 120 mM NaCl, 5 mM KCl, 2 mM $CaCl_2$, 1 mM $MgCl_2$) at a concentration of membrane equivalent to 1 gm wet weight cortex per 10 ml buffer. After protein determination the final membrane preparation was diluted with buffer to 3 mg protein/ml. This membrane preparation was used in either the fresh state or frozen (−70° C.) then thawed.

The binding assay is performed manually using 96-well plates, or using a Biomek automated work station (Beckman Instrument Co.). $^3$H-Nicotine was diluted in assay buffer to give a final concentration of 1.9 nM. The Biomek automated work station was programmed to automatically transfer 750 μl of assay buffer with $^3$H-nicotine, 230 μl of membrane preparation and 20 μl of solution containing the compound of interest in assay buffer, DMSO, ethanol:DMSO (1:1) or appropriate vehicle to the 96-well plate. Atropine was added to the incubation buffer at a final concentration of 3 μM to block binding to muscarinic acetylcholine receptor sites. The plates were maintained on ice for 60 min and the tissue-bound radioactivity was separated from the free by rapid filtration in a Brandel Harvester onto GF/C filters presoaked in 0.5% polyethyleneimine for at least 2 hr. The filters were washed with 4×2 ml of ice-cold assay buffer and filters were transferred to vials to which 4 ml of scintillation cocktail was added. The radioactivity was measured in a LS-6500 Beckman Liquid Scintillation Counter in an auto-dpm mode. Data were analyzed by log-logit transformation or non-linear regression analysis (e.g., employing GraphPad Prism, available from GraphPad Software, San Diego, Calif.) to give $IC_{50}$ values. Non-specific binding was defined by 10 μM cytisine.

The ability of invention compounds to displace $^3$H-QNB (quinuclidinyl benzilate; 43 Ci/mmol) from muscarinic acetylcholine receptors in rat cerebral membranes was also tested using the above-described method in which $^3$H-nicotine was replaced with 60 pM $^3$H-QNB, and atropine was excluded from the incubation buffer.

The results of $^3$H-nicotine, $^3$H-cytisine and $^3$H-QNB binding/displacement assays of several invention compounds are summarized in Table I.

TABLE I

Displacement of Radiolabeled Ligands

| Compound tested, Formula I, wherein . . . | $IC_{50}$ (μM) | | |
|---|---|---|---|
| | Nicotine | Cytisine | Quinuc Benz |
| A = 4-hydroxyphenyl;<br>B = absent;<br>D = —S—;<br>E = —CH$_2$CH$_2$—;<br>G = 1-methylpyrrolidine | 0.11 | 0.32 | 1.85 |
| A = 4-aminophenyl;<br>B = —CH$_2$CH$_2$CH$_2$—;<br>D = —C(O)O—;<br>E = —CH$_2$—;<br>G = 1-methylpyrrolidine | 0.082 | 0.19 | 0.6 |
| A = 4-hydroxyphenyl;<br>B = —CH$_2$CH$_2$—;<br>D = —C(O)O—;<br>E = —CH$_2$—;<br>G = 1-methylpyrrolidine | 0.075 | 0.22 | >10 |
| A = 3-fluoro-4-methoxyphenyl;<br>B = absent;<br>D = —S—;<br>E = —CH$_2$CH$_2$—;<br>G = 1-methylpyrrolidine | 0.38 | 5.5 | 2.9 |
| A = 2-chloro-4-hydroxyphenyl;<br>B = absent;<br>D = —S—;<br>E = —CH$_2$CH$_2$—;<br>G = 1-methylpyrrolidine | 0.16 | 0.44 | 3.3 |
| A = phenyl;<br>B = —CH$_2$CH$_2$—;<br>D = —C(O)O—;<br>E = —CH$_2$—;<br>G = 1-methylpyrrolidine | 0.35 | 1.3 | 1.12 |

As evidenced by the $IC_{50}$ values in the Table, each of the compounds tested was able to displace acetylcholine receptor ligands from their binding sites in rat cerebral membranes.

EXAMPLE 6

Neurotransmitter Release

Measurement of $^3$H-dopamine ($^3$H-DA) release from rat striatal slices was performed according to the method of Sacaan et al., (J. Pharmacol. Comp. Ther 224:224–230 (1995)). Male Sprague-Dawley rats (250–300 g) were decapitated and the striata or olfactory tubercles dissected quickly on a cold glass surface. The tissue was chopped to a thickness of 300 μm with a McIlwain tissue chopper. After chopping again at right angles the tissue was dispersed and incubated for 10 min. at 37° C. in oxygenated Kreb's buffer. $^3$H-Dopamine (40 Ci/mmol, NEN-Dupont, Boston, Mass.) was added (50 nM) and the tissue was incubated for 30 min. in Kreb's buffer containing 10 μM pargyline and 0.5 mM ascorbic acid. Aliquots of the minced tissue were then transferred to chambers of a Brandel Superfusion system in which the tissue was supported on Whatman GF/B filter discs. The tissue was then superfused with buffer at a constant flow rate of 0.3 ml/min by means of a Brandel peristaltic pump. The perfusate was collected in plastic scintillation vials in 3-min fractions, and the radioactivity was estimated by scintillation spectrophotometry. The superfusate for the first 120 min was discarded. After two baseline fractions had been collected, the superfusion buffer was switched to fresh buffer with or without compound of interest. At the end of the experiment the filter and the tissue were removed, and the radiolabeled neurotransmitter content was estimated after extraction into scintillation fluid. The fractional efflux of radiolabeled neurotransmitter was estimated as the amount of radioactivity in the perfusate fraction relative to the total amount in the tissue.

Following essentially the same procedure as set forth in the preceding paragraph, the amount of $^3$H-norepinephrine $^3$H-NE) released from rat hippocampus, thalamus and pre-frontal cortex slices superfused with buffer containing (or lacking) compounds of interest was also measured.

The results of studies of the effects of an invention compound (as compared to the effect of nicotine) on the release of neurotransmitters from rat brain slices are presented in Table II. The results presented in the Table are expressed as the percent fractional release.

TABLE II

Ligand-Stimulated Neurotransmitter Release Data

| Ligand or Compound Tested,<br>Formula I, wherein . . .<br>Nicotine | % of Nicotine Response[a] | |
|---|---|---|
| | $^3$H-DA*<br>Striatum<br>100 (10 μM) | $^3$H-NE*<br>Hippocampus<br>100 (300 μM) |
| A = 4-hydroxyphenyl;<br>B = absent;<br>D = —S—;<br>E = —CH$_2$CH$_2$—;<br>G = N-methyl-2-pyrrolidine | 453 | 32 |
| A = 3-fluoro-4-methoxyphenyl;<br>B = absent;<br>D = —S—;<br>E = —CH$_2$CH$_2$—;<br>G = N-methyl-2-pyrrolidine | 21 | n.d. |
| A = 2-chloro-4-hydroxyphenyl;<br>B = absent;<br>D = —S—;<br>E = —CH$_2$CH$_2$—;<br>G = N-methyl-2-pyrrolidine | 800 | n.d. |
| A = 4-hydroxyphenyl;<br>B = absent;<br>D = —S—;<br>E = —CH$_2$CH$_2$CH$_2$—;<br>G = R$^E$ and R$^F$ combine to form a 6-membered ring | 225 | 12 |
| A = 4-hydroxyphenyl;<br>B = absent; | 165 | n.d. |

TABLE II-continued

Ligand-Stimulated Neurotransmitter Release Data

| | % of Nicotine Response[a] | |
|---|---|---|
| Ligand or Compound Tested, Formula I, wherein . . . Nicotine | $^3$H-DA* Striatum 100 (10 µM) | $^3$H-NE* Hippocampus 100 (300 µM) |
| D = —S—; E = —CH$_2$CH$_2$—; G = dimethylamino A = 4-hydroxyphenyl; B = absent; | 660 | n.d. |
| D = —S—; E = —CH$_2$—; G = N-methyl 7-azabicyclo-[2.2.1]heptane A = 4-hydroxyphenyl; B = absent; | 450 | n.d |
| D = —S—; E = absent; G = N-methyl-4-piperidino | | |

*DA = Dopamine;
NE = Norepinephrine
[a]Each compound was tested at 300 µM
[b]n.d. = not determined As shown in Table II, invention compound selectively induces release of catecholamines in different brain regions.

EXAMPLE 7

Measurement of Acetylcholine Release in Rat Hippocampus

Male Sprague Dawley Rats (230–290 g) were anesthetized in a chamber saturated with isofluorane. Once immobilized, the rats were mounted in a Kopf stereotaxic apparatus with the incisor bar set at −3.3 mm (Praxinos and Watson, 1986). A midline incision was made on the skull to expose the underlying fascia. The skull was cleaned with an antibacterial preparation containing iodine and a hole was made in the skull at the following coordinates: AP, −3.5 mm and ML, +2.0 mm (Praxinos and Watson, 1986). A stainless steel guide cannula (Small Parts, Inc., Stillwater, Fla.) was cut to 2.0 mm length and inserted into the hole. Three additional holes were drilled into the skull surrounding the guide cannula and small machine 20 screws were placed into these holes. The guide cannula and screws were secured by dental cement. A dummy cannula was inserted into the guide cannula to prevent clogging. The animals were removed from the stereotaxic frame and single housed for 3–7 days with free access to food and water.

On the day of the experiment, the rats were briefly anesthetized with isofluorane and the dummy cannulae were removed. A microdialysis cannula containing a Loop type probe with a rigid shaft and molecular weight cut-off of 6000 (ESA Inc, Chelmsfold, Mass.) of approximately 2 mm in length, was inserted into the guide cannula. Under these conditions, the microdialysis probe extended 2 mm beneath the guide cannula. The animal was placed in plastic bowl (CMA 120; CMA Microdialysis, Acton, Mass., USA) with a harness around the neck. The microdialysis probe was connected to a syringe pump through which a salt solution representing the ionic concentration of the cerebrospinal fluid (artificial CSF; 145 mM NaCl; 27 mM KCl; 10 mM MgCl$_2$ and 12 mM CaCl$_2$; pH 7.4; Moghaddam and Bunney, J. Neurochem, 53, 652–654, 1989) containing 100 nM neostigmine was pumped at a rate of 1.5 µL/min.

Twenty minute fractions were collected and automatically injected via a sample loop and an auto-injector. The on-line microdialysis comprised of the following components: a CMA/100 microsyringe pump connected to a CMA/111 syringe selector. The mobile phase (100 mM disodium hydrogen phosphate; 2.0 mM 1-octane sulfonic acid sodium salt; 0.005% reagent MB (ESA Inc., Chelmeford, Mass.) pH 8.00 with phosphoric acid) was pumped using a model 580 ESA pump through a polymeric reverse phase column (ACH-3, ESA Inc., 3 µM spherical particles; 3.2 mm×15 cm). The effluent from the column was passed through an enzyme reactor containing immobilized acetylcholinesterase and choline oxidase (ACH-SPR, ESA Inc.). The HPLC column and the enzyme reactor were placed in a housing with a constant temperature of 35° C. Acetylcholine and choline in microdialysis samples were converted into hydrogen peroxide which was detected by amperometric oxidation in a ESA model 5041 analytical cell containing a glassy carbon target electrode and a palladium reference electrode. The 30 oxidation potential was 250 mV and the signal was detected by a ESA model 5200 Å Coulochem detector. The retention times for choline and acetylcholine under these conditions were 4 and 6 min, respectively. The limit of detection for acetylcholine was less than 100 fmol on column.

On the day of the experiment, 10–12 fractions were collected to establish the baseline acetylcholine release. Following the establishment of baseline, rats were injected with the test compound and samples were collected until the levels of acetylcholine in the dialysate samples returned to baseline levels (3–5 hr). Compounds were typically dissolved in saline and the pH of the solution was adjusted by the addition of NaOH. An example of the results that may be obtained are demonstrated in the data below in which rats were injected with a compound according to Formula Z wherein A=4-hydroxyphenyl, B is not present, D=—S—, E=—CH$_2$CH$_2$—, and G=1-methylpyrrolidino, at a dose of 40 mg/kg in a volume of 0.2 cc/rat.

Figure 2:
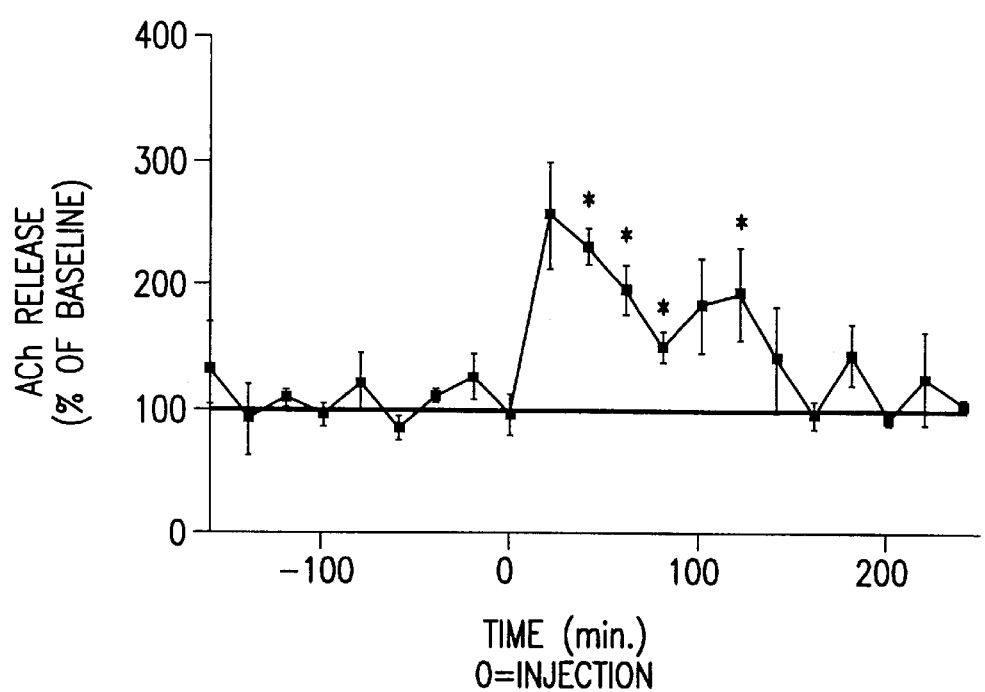
FIG. 2 illustrates acetylcholine release in the hippocampus induced by nicotine. Nicotine (0.4 mg/kg) was injected at time 0, and acetylcholine levels measured as described in Example 7. Statistical significance was determined using students t-test versus saline control animals (*P<0.05, n=4 animals).
Figure 3:
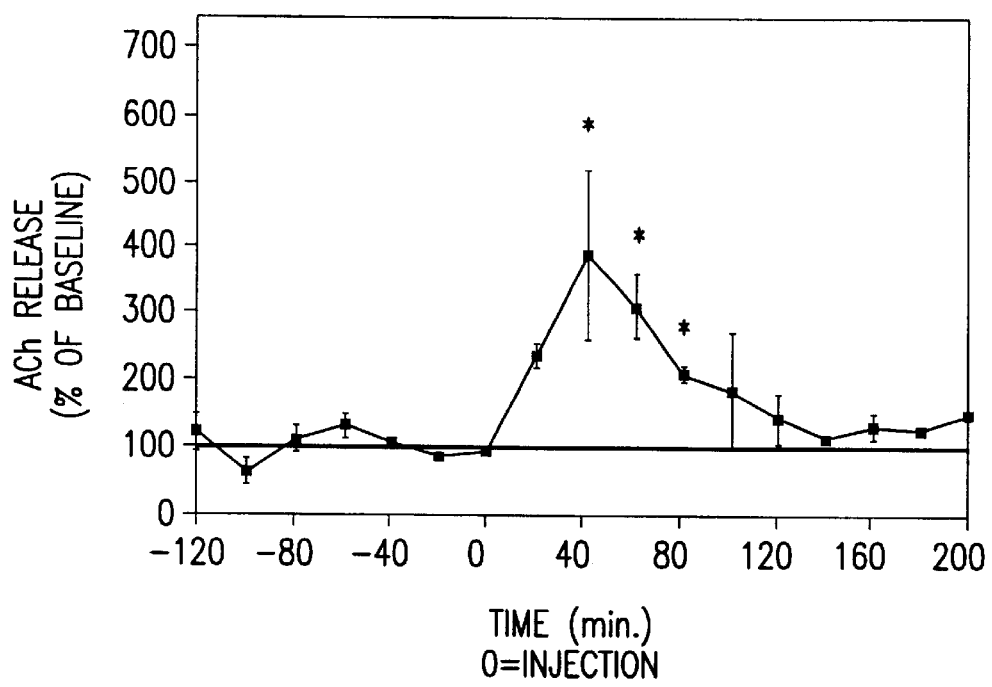
FIG. 3 illustrates acetylcholine release in the hippocampus induced by lobeline. Lobeline (5.0 mg/kg) was injected at time 0, and acetylcholine levels measured as described in Example 7. Statistical significance was determined using students t-test versus saline control animals (*P<0.05, n=3 animals).
Figure 4:
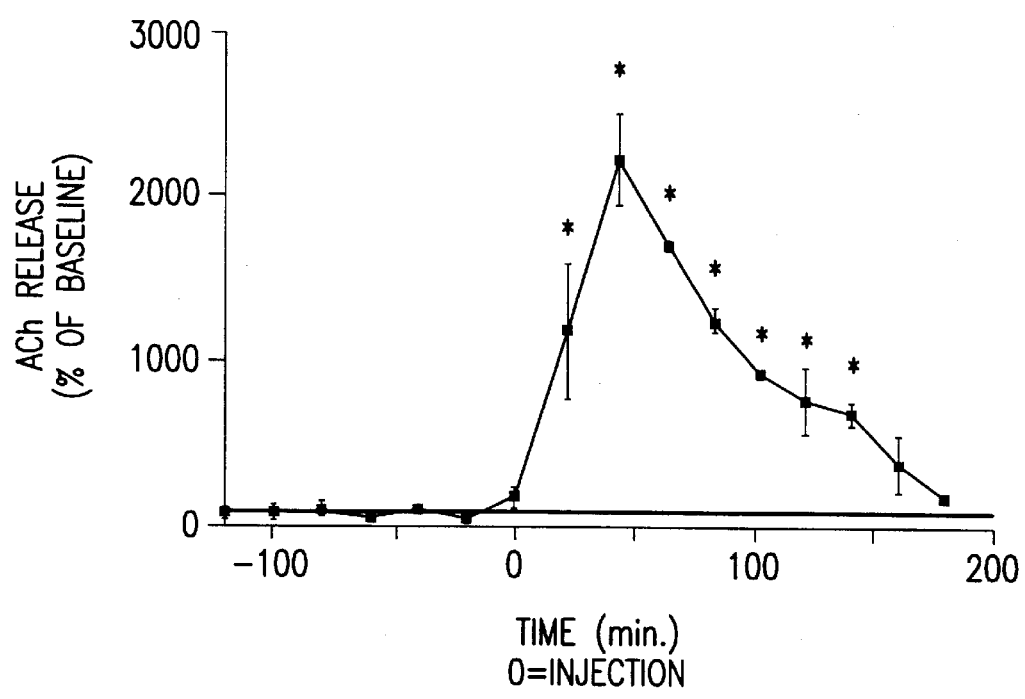
FIG. 4 illustrates acetylcholine release in the hippocampus induced by the compound of Formula Z (as defined hereinafter) wherein A=4-hydroxyphenyl, B is not present, D=—S—, E=—CH$_2$CH$_2$—, and G=1-methylpyrrolidino. This compound (40 mg/kg) was injected at time 0, and acetylcholine levels measured as described in Example 7. Statistical significance was determined using students t-test versus saline control animals (*P<0.05, n=3 animals).
Figure 5:
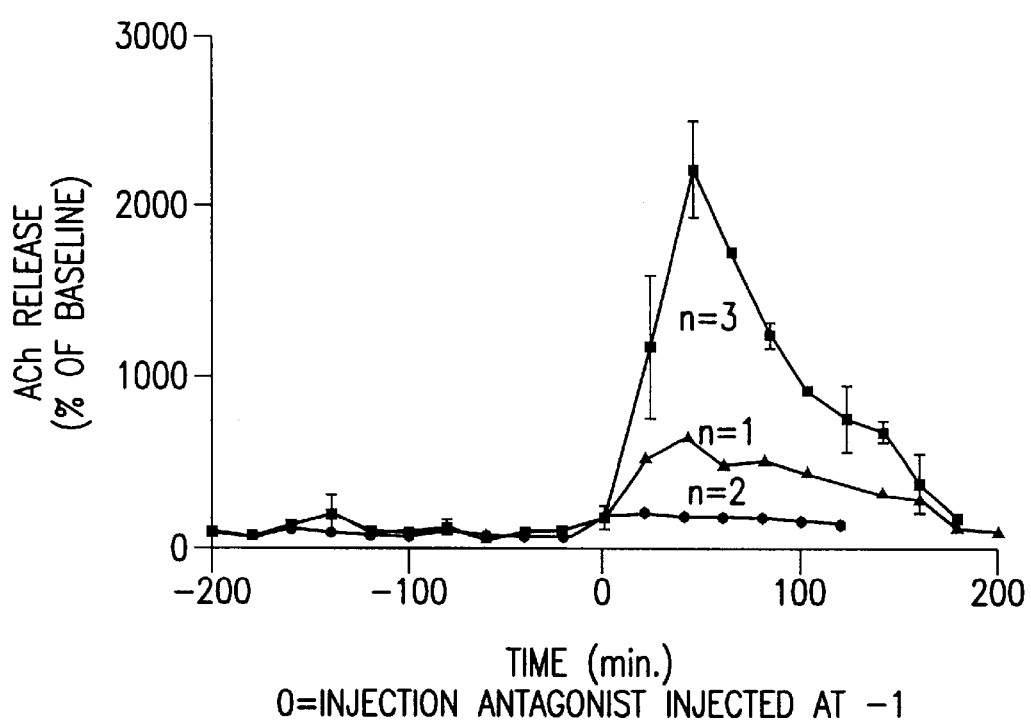
FIG. 5 illustrates acetylcholine release in the hippocampus induced by the above-described compound of Formula Z (closed squares), mecamylamine and the D1 dopamine antagonist, SCH22390 (RBI, Inc., Nadick, Mass.).

The effects of various treatments on hippocampal acetylcholine receptors are shown in Table 1 and FIGS. 1–5. The attenuation of acetylcholine release by mecamylamine induced by a compound having Formula Z wherein A=4-hydroxyphenyl, B=not present, D=—S—, E=—CH$_2$CH$_2$—, and G=1-methylpyrrolidino, arguing for the involvement of nicotinic acetylcholine receptors in this response.

TABLE III

| Treatment | Peak Increase, % of Baseline | Duration of Increase Above Baseline (min.) |
|---|---|---|
| Saline | 220 | 20 |
| Nicotine | 220 | 200 |
| Lobeline | 400 | 200 |
| Compound of Formula Z wherein: A = 4-hydroxyphenyl, B = not present, D = —S—, E = —CH$_2$CH$_2$—, and G = N-methyl-2-pyrrolidino | 2,000 | 200 |
| Compound of Formula Z wherein: A = 4-hydroxyphenyl, B = not present, D = —S—, E = —CH$_2$CH$_2$CH$_2$—, and | 1,000 | 100 |

TABLE III-continued

| Treatment | Peak Increase, % of Baseline | Duration of Increase Above Baseline (min.) |
|---|---|---|
| G = $R^E$ and $R^F$ combine to form a 6-membered ring Compound of Formula Z wherein: A = 4-hydroxyphenyl, B = not present, D = —S—, E = —CH$_2$CH$_2$—, and G = $R^E$ and $R^F$ combine to form a 6-membered ring | 960 | 100 |
| Compound of Formula Z wherein: A = 4-hydroxyphenyl, B = —CH$_2$—, D = —S—, E = —CH$_2$CH$_2$—, and G = N-methyl-2-pyrrolidino | 817 | 100 |

The effects of invention compounds on locomotor activity of rats were evaluated using the procedure of O'Neill et al., *Psychopharmacology* 104:343–350 (1991). This assay can be used to assess the primary effect of a compound on general motor activity. A decrease in locomotor activity is indicative of a possible sedative effect on the animal, whereas an increase in locomotor activity is indicative of a stimulant effect on the animal.

Locomotor activity of rats (male Sprague-Dawley (Harlan) weighing 200–250 gm) was measured for 2 hrs in photocell cages immediately after administration of the invention compound. Prior to the test day, the animals were placed in the activity cages for 3 hrs to familiarize them with the experimental environment. On the test day, the animals were placed in the photocell cages and then injected with compound 1.5 hrs later.

The photocell cages were standard rodent cages (30 cm×20 cm×40 cm) with four infrared beams crossing the long axis. The animals were under no motivational constraints and were free to move around. Movements from one infrared beam to another (ambulation) were called "crossover"; successive interruptions of the same beam (vertical and other movements such as grooming) were called "general activity."

The results of one such study are shown in Table IV. Results are reported as the percent of change from control values (i.e., saline injection) for two post-injection periods: 0–60 minutes and 60–120 minutes, respectively.

While the invention has been described in detail with reference to certain preferred embodiments thereof, it will be understood that modifications and variations are within the spirit and scope of that which is described and claimed.

That which is claimed is:

1. A compound having the Formula (Z) as follows:

A—D—E—G   (Z)

or enantiomers, diastereomeric isomers or mixtures of any two or more thereof, or pharmaceutically acceptable salts thereof, wherein:

A has the structure (I):

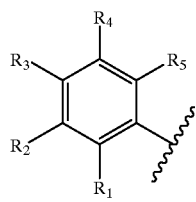

(I)

wherein:
each of $R_1$, $R_2$, $R_4$, and $R_5$ is independently hydrogen, lower alkyl, or halogen;
$R_3$ is:
—O—C(O)—N(CH$_3$)$_2$,
—CH$_2$—NHSO$_2$—R$_D$,
—O—C(O)—R$_A$,
—O—R$_A$,
hydroxy,
amino,
amino(toluenesulfonate),
—NHSO$_2$—R$_A$,
—NHSO$_2$—N(R$_A$)$_2$,
—C(O)—OH, or
—CH$_2$—NHSO$_2$—R$_A$
wherein R$_A$ is —CH$_3$ or —CF$_3$;
R$_D$ is hydrogen, or lower alkyl;
D is —S—;
E is —CH$_2$—CH$_2$—; and
G is a nitrogen-containing cyclic moiety having the structure (II):

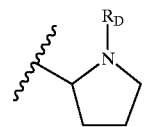

(II)

wherein R$_D$ is hydrogen, or lower alkyl.

2. A compound according to claim 1 wherein A is 4-hydroxyphenyl, 4-aminophenyl, 2-chloro-4-hydroxyphenyl or 3-fluoro-4-methoxyphenyl.

3. A compound according to claim 1 wherein:
A=2-chloro-4-hydroxyphenyl,
and R$_D$ is hydrogen or methyl.

4. A compound according to claim 1 wherein:
A=3-fluoro-4-hydroxyphenyl,
and R$_D$ is hydrogen or methyl.

5. A compound according to claim 1 wherein:
A=4-hydroxyphenyl,
and R$_D$ is hydrogen or methyl.

6. A compound according to claim 1 wherein:
A=2-fluoro-4-hydroxyphenyl,
and R$_D$ is hydrogen or methyl.

7. A compound according to claim 1 wherein:
A=4-(NHSO$_2$—R$_A$)-phenyl, wherein R$_A$ is —CH$_3$ or —CF$_3$,
and R$_D$ is hydrogen or methyl.

8. A compound according to claim 1 wherein:
A=4-amino(toluenesulfonate)phenyl,
and R$_D$ is hydrogen or methyl.

9. A compound according to claim 1 wherein:

A=2-methyl-4-hydroxyphenyl, and $R_D$ is hydrogen or methyl.

10. A compound according to claim 1 wherein:

A=4-methylacetate phenyl.

11. A compound according to claim 1 wherein: A=4-carboxyphenyl.

12. A compound according to claim 1 wherein:

A=4-(O—C(O)—N(CH$_3$)$_2$)phenyl.

13. A compound according to claim 1 wherein:

A=4-(CH$_2$—NHSO$_2$—R$_A$)-phenyl, wherein $R_A$ is methyl or —CF$_3$.

14. A compound according to claim 1 wherein:

A=4-(NH—SO$_2$—N(R$_A$)$_2$)-phenyl, wherein $R_A$ is methyl or —CF$_3$.

15. A method of modulating the activity of acetylcholine receptors, said method comprising:

contacting cell-associated receptors with a sufficient concentration of a compound according to claim 1 to modulate the activity of said acetylcholine receptors.

16. Method for treating Parkinson's disease, said method comprising administering a therapeutically effeective amount of a compound according to claim 1 to a patient suffering from Parkinson's disease.

17. Method for treating Alzheimer's disease, said method comprising administering a therapeutically effeective amount of a compound according to claim 1 to a patient suffering from Alzheimer's disease.

18. Method for treating dementia, said method comprising administering a therapeutically effeective amount of a compound according to claim 1 to a patient suffering from dementia.

19. Method for controlling pain, said method comprising administering a therapeutically effeective amount of a compound according to claim 1 to a patient suffering from pain.

* * * * *